(12) United States Patent
Funabashi

(10) Patent No.: US 11,086,922 B2
(45) Date of Patent: Aug. 10, 2021

(54) FARM WORK SUPPORT DEVICE AND METHOD, PROGRAM, RECORDING MEDIUM, AND FARM WORK SUPPORT SYSTEM

(71) Applicant: Sony Corporation, Tokyo (JP)

(72) Inventor: Masatoshi Funabashi, Tokyo (JP)

(73) Assignee: Sony Corporation, Tokyo (JP)

( * ) Notice: Subject to any disclaimer, the term of this patent is extended or adjusted under 35 U.S.C. 154(b) by 993 days.

(21) Appl. No.: 14/408,476

(22) PCT Filed: Jun. 25, 2013

(86) PCT No.: PCT/JP2013/067364
§ 371 (c)(1),
(2) Date: Dec. 16, 2014

(87) PCT Pub. No.: WO2014/007109
PCT Pub. Date: Jan. 9, 2014

(65) Prior Publication Data
US 2015/0186387 A1    Jul. 2, 2015

(30) Foreign Application Priority Data

Jul. 4, 2012  (JP) .............................. JP2012-150172

(51) Int. Cl.
*G06Q 50/02*    (2012.01)
*A01G 7/00*    (2006.01)
(Continued)

(52) U.S. Cl.
CPC ............. *G06F 16/444* (2019.01); *A01G 7/00* (2013.01); *A01G 22/00* (2018.02);
(Continued)

(58) Field of Classification Search
CPC ...... G06Q 50/02; G06Q 10/04; G06Q 10/063; G06Q 10/0637; A01G 1/001; A01G 7/00
See application file for complete search history.

(56) References Cited

U.S. PATENT DOCUMENTS

2001/0016053 A1* 8/2001 Dickson ................ G01J 3/2803
382/110
2002/0059091 A1* 5/2002 Hay ....................... G06Q 10/06
705/7.28
(Continued)

FOREIGN PATENT DOCUMENTS

JP    2003-132139    5/2003
JP    2004-199332    7/2004
(Continued)

OTHER PUBLICATIONS

Mamolos, Andreas P., "Significance of Allelopathy in Crop Rotation," Journal of Crop Production, Oct. 2008.*
(Continued)

*Primary Examiner* — Renae Feacher
(74) *Attorney, Agent, or Firm* — K&L Gates LLP

(57) ABSTRACT

Provided is a farm work support device including a reception unit configured to receive designation of plants to be cultivated, a retrieval unit configured to retrieve a vegetation design which is a vegetation combination proper for construction of a mixed and dense growth state of the designated plants, and an output unit configured to output the retrieved vegetation design.

39 Claims, 23 Drawing Sheets

(51) Int. Cl.
*A01G 22/00* (2018.01)
*G06F 16/44* (2019.01)
*G06F 16/532* (2019.01)
*G06F 16/2457* (2019.01)
*G06Q 10/00* (2012.01)
*G06K 7/10* (2006.01)
*H04N 5/225* (2006.01)

(52) U.S. Cl.
CPC ...... *G06F 16/24578* (2019.01); *G06F 16/532* (2019.01); *G06K 7/10297* (2013.01); *G06Q 10/00* (2013.01); *G06Q 50/02* (2013.01); *H04N 5/225* (2013.01)

(56) References Cited

U.S. PATENT DOCUMENTS

| | | | |
|---|---|---|---|
| 2002/0103688 A1* | 8/2002 | Schneider | G06Q 10/06375 705/7.28 |
| 2002/0133505 A1* | 9/2002 | Kuji | G06Q 30/02 |
| 2004/0122592 A1* | 6/2004 | Fuessley | A01G 7/06 702/2 |
| 2005/0114946 A1* | 5/2005 | Hoffbeck | A01H 5/10 800/320.1 |
| 2007/0260400 A1 | 11/2007 | Morag | |
| 2008/0157990 A1 | 7/2008 | Belzer et al. | |
| 2008/0157999 A1* | 7/2008 | Koutari | G01C 21/265 340/4.4 |
| 2009/0216661 A1* | 8/2009 | Warner | G06Q 30/02 705/26.1 |
| 2012/0010789 A1* | 1/2012 | Dulnigg | A01C 21/007 701/50 |
| 2012/0215729 A1* | 8/2012 | Johnson | G06N 5/02 706/45 |
| 2013/0204419 A1* | 8/2013 | Pettersson | B65B 59/001 700/97 |
| 2013/0282423 A1* | 10/2013 | Hori | G06Q 50/02 705/7.25 |
| 2014/0012732 A1* | 1/2014 | Lindores | G06Q 50/02 705/37 |
| 2014/0168412 A1* | 6/2014 | Shulman | H04N 7/18 348/89 |
| 2014/0278731 A1* | 9/2014 | Griffin | G06Q 10/0635 705/7.28 |
| 2015/0186387 A1* | 7/2015 | Funabashi | G06F 16/532 707/723 |
| 2017/0223947 A1* | 8/2017 | Gall | G01N 21/4738 |

FOREIGN PATENT DOCUMENTS

| | | |
|---|---|---|
| JP | 2005-176748 | 7/2005 |
| JP | 2007-124932 | 5/2007 |
| JP | 2010-231733 | 10/2010 |
| WO | 2012086232 | 6/2012 |

OTHER PUBLICATIONS

International Search Report issued in connection with International Patent Application No. PCT/JP2013/067364, dated Jul. 30, 2013. (1 page).

Search Report received in EP Application 13813360.8, dated Jan. 21, 2016, 8 pages.

Notification of the Fourth Office Action issued in connection with Chinese Patent Application No. 201380034513.8, dated Feb. 11, 2018. (21 pages).

Current research on plant allelopathy and its application in agricultural production, Acta Agricultume Zhejiangensis, 2012, 24( 2): pp. 343-348. (6 pages).

Japanese Office Action dated Jan. 22, 2019 for Japanese Appln. No. 2017-230838 (3 pages).

IPSJ Symposium Series vol. 2011, No. DICOM02011, Jul. 6, 2011, retrieved Jan. 24, 2019, file:///C:/Users /9004052345 /Desktop/20 190 12209 1528_A30_, (28 pages).

Human Interface 2011 SENDAI, Sep. 13, 2011-Sep. 16, 2011, retrieved Jan. 24, 2019, file:///C:/Users /9004052345 /Desktop/20 190 12209 1528_A30_ (23 pages).

\* cited by examiner

FIG.5

PLANTING DATABASE

| RECORDED YEAR, MONTH, AND DAY | FIELD DIVISION | RIB NUMBER | RIB DIVISION | SEED/ SEEDLING | PRODUCT NAME | PRODUCT NAME | QUANTITY | MAKER |
|---|---|---|---|---|---|---|---|---|
| 12/01/18 | SW | All | | SEEDLING | POTATO (MAY QUEEN) | POTATO | 0.5kg | A |
| 12/01/18 | SW | All | | SEEDLING | POTATO (IRISH COBBLER POTATO) | POTATO | 0.5kg | A |
| 12/01/18 | SW | All | | SEEDLING | POTATO (KITAAKARI) | POTATO | 0.5kg | A |
| 12/01/18 | SE | 1, 4 | d1 | SEEDLING | ASPARAGUS | ASPARAGUS | 4 ROOTS | B |
| 12/01/18 | All | | | SEED | LETTUCE (KING CROWN) | LETTUCE | 2 BAGS | C |
| 12/01/18 | All | | | SEED | LETTUCE (REDWAVE) | LETTUCE | 2 BAGS | C |
| 12/01/18 | All | | | SEED | LETTUCE (LEAF LETTUCE) | LETTUCE | 2 BAGS | C |
| 12/01/18 | All | | | SEED | LETTUCE (AKABANE CHIMASANCHU) | LETTUCE | 2 BAGS | C |
| 12/01/18 | All | | | SEED | STEM BROCCOLI | BROCCOLI | 2 BAGS | C |
| 12/01/18 | All | | | SEED | LETTUCE (BUTTERHEAD MINI LETTUCE) | LETTUCE | 2 BAGS | D |

FIG. 6

| VEGETATION DATABASE | | |
|---|---|---|
| RECORDED YEAR, MONTH, AND DAY | 12/01/23 | 12/02/25 |
| MEASURED DIVISION COORDINATES | | |
| NE | FAVA BEANS/SPROUTS ESTABLISHED | FAVA BEANS/SPROUTS ESTABLISHED |
| | CARROTS/HARVEST POSSIBLE | CARROTS/HARVEST POSSIBLE |
| | RADISHES/HARVEST POSSIBLE | RADISHES/HARVEST POSSIBLE |
| | GREEN ONIONS/ESTABLISHED | GREEN ONIONS/ESTABLISHED |
| | BROCCOLI SEEDLINGS/ESTABLISHED | BROCCOLI SEEDLINGS/ESTABLISHED |
| | CABBAGE SEEDLINGS/ESTABLISHED | CABBAGE SEEDLINGS/ESTABLISHED/HARVEST POSSIBLE |
| | NAPA CABBAGE SEEDLINGS/ESTABLISHED/HARVEST POSSIBLE | NAPA CABBAGE SEEDLINGS/ESTABLISHED/HARVEST POSSIBLE |
| | POACEAE | POACEAE |
| | ASTERACEAE | ASTERACEAE |
| | LEGUMINOSAE | LEGUMINOSAE |
| | RED WINDING CHICORY/HARVEST POSSIBLE | RED WINDING CHICORY/HARVEST POSSIBLE |
| | | PEAS/SPROUTS ESTABLISHED |
| | | CAULIFLOWER SEEDLINGS/ESTABLISHED/HARVEST POSSIBLE |
| | | ITALIAN PARSLEY/ESTABLISHED/HARVEST POSSIBLE |

FIG. 7

YIELD DATABASE
UNIT:g

| | KIND | 1/14 | 1/24 | 1/29 | 1/30 | 1/31 | 2/20 |
|---|---|---|---|---|---|---|---|
| 1 | HORONIGA LETTUCE | 100 | | | | | |
| 2 | DAIKON | | 1700 | 4000 | 1500 | 740 | 1500 |
| 3 | TURNIPS | 95 | | | | 100 | |
| | TURNIPS (W FARM) | | | | | | |
| 4 | ITALIAN PARSLEY | | | | | 75 | |
| 5 | SALAD CHIVES | | | | | | |
| 6 | MINT | | | | | | |
| 7 | ROSEMARY | | 240 | | | 300 | 300 |
| 8 | KOMATSUNA | | | | | | |
| 9 | MU VEGETABLE | | | | | | |
| 10 | GREEN ONIONS | 120 | | | | 240 | |
| 11 | RADISHES | | | | | | |
| | RADISHES (W) | | | | | | |
| 12 | CELERY | 45 | | | | | |
| 13 | BURDOCK | | | | | | |
| 14 | BOK-CHOI | | | | | | |
| 15 | GARLAND CHRYSANTHEMUMS | | | | | | |
| 16 | SMALL GINSENG | 50 | | 320 | 260 | 90 | |
| | SMALL GINSENG (W) | | | | | | |
| | LARGE AND MEDIUM GINSENG (W) | | 540 | | 313 | 6 PIECES | |
| 17 | CAULIFLOWER | | | | | 200 | |
| 18 | CABBAGE (STEM CABBAGE?) | 100 | | | | 160 | |
| 19 | ISLAND JAPANESE LEEK | 30 | | | | | |
| 20 | NAPA CABBAGE | | 2700 | 11800 | 570 | 850 | 4000 |
| 21 | BUTTERBUR SPROUTS | | | | | | 300 |

FIG. 8

| MANAGEMENT RECORDING DATABASE | |
|---|---|
| DATE | MANAGEMENT WORK |
| 12/01/19 | SEEDLING PLANTING, CONSTRUCTION WORK SUCH AS WIND PROTECTION FENCE MAKING |
| 12/01/20 | SEEDLING PLANTING, CONSTRUCTION WORK SUCH AS WIND PROTECTION FENCE MAKING |
| 12/01/21 | SEEDLING PLANTING, CONSTRUCTION WORK SUCH AS WIND PROTECTION FENCE MAKING |
| 12/01/22 | SEEDLING PLANTING, CONSTRUCTION WORK SUCH AS WIND PROTECTION FENCE MAKING |
| 12/01/23 | SEEDLING PLANTING, CONSTRUCTION WORK SUCH AS WIND PROTECTION FENCE MAKING |

FIG. 9

| PHENOLOGY DATABASE | |
|---|---|
| RECORDING DATE | PHENOLOGY |
| 2011/01/09 | UNCLEAR KIND OF GRASS |
| 2011/01/09 | GROWING BETTER THAN OTHERS |
| 2011/01/09 | LOWER PORTIONS OF PEAS, WITHERED |
| 2011/01/09 | PLACE AT WHICH PLANT GROWS MORE THAN OTHERS |

FIG. 11

INSECT AND ANIMAL PLEXUS DATABASE

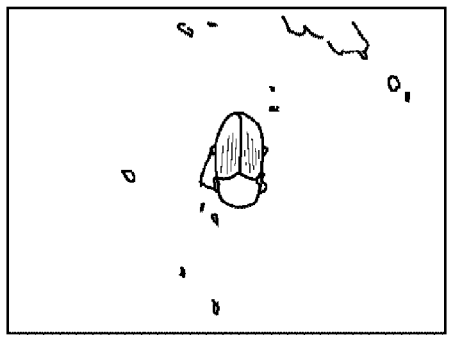

A

20120218ISE_087
MEASURED VALUE: ISE NEW FARM, INSECTS: ORDER: COLEOPTERA,
FAMILY: TENEBRIONIDAE, CLASSIFICATION: DARKLING BEETLE?:
GENERAL SITUATION: INSECT HIBERNATES IN GROUPS UNDER STONES

B

20120218ISE_088
MEASURED VALUE: ISE NEW FARM, INSECTS: ORDER: COLEOPTERA,
FAMILY: TENEBRIONIDAE, CLASSIFICATION: DARKLING BEETLE?:
GENERAL SITUATION: INSECT HIBERNATES IN GROUPS UNDER STONES

C

20120218ISE_089
MEASURED VALUE: ISE NEW FARM, CREATURE: ARACHNID, ORDER: ARANEAE,
FAMILY: LYCOSIDAE, BINOMIAL NAME: PARDOSA ASTRIGERA,
GENERAL SITUATION: MOST COSMOPOLITAN SPECIES IN WOLF SPIDER FAMILY
AND OFTEN OBSERVED WANDERING NEAR EARTH'S SURFACE

FIG.12

WEATHER DATABASE

| MONTH | TEN DAYS | AIR PRESSURE(hPa) | | PRECIPITATION(mm) | | | | TEMPERATURE(°C) | | | | | HUMIDITY(%) | |
|---|---|---|---|---|---|---|---|---|---|---|---|---|---|---|
| | | LOCAL DISTRICT AVERAGE | SEA LEVEL AVERAGE | TOTAL | MAXIMUM | | | AVERAGE | | | HIGHEST | LOWEST | AVERAGE | MINIMUM |
| | | | | | DAY | FOR 1 HOUR | FOR 10 MINUTES | AVERAGE IN DAY | HIGHEST IN DAY | LOWEST IN DAY | | | | |
| 1 | FIRST | 1018.7 | 1021.0 | 0.5 | 0.5 | 0.5 | 0.5 | 5.2 | 9.2 | 2.0 | 11.6 | 0.2 | 62 | 24 |
| | SECOND | 1016.8 | 1019.1 | 36.0 | 19.5 | 3.5 | 1.0 | 5.2 | 8.6 | 1.8 | 11.1 | -1.1 | 64 | 32 |
| | LAST | 1015.4 | 1017.7 | 3.0 | 3.0 | 1.0 | 0.5 | 4.8 | 8.5 | 2.2 | 12.8 | -0.1 | 60 | 25 |
| 2 | FIRST | 1015.0 | 1017.3 | 33.0 | 27.5 | 9.0 | 2.5 | 3.8 | 7.4 | 0.7 | 10.2 | -2.5 | 60 | 29 |
| | SECOND | 1018.1 | 1020.4 | 9.5 | 7.0 | 2.5 | 1.0 | 4.0 | 7.9 | 1.2 | 10.3 | -2.7 | 63 | 25 |
| | LAST | 1015.6 | 1017.8 | 58.0 | 34.5 | 7.0 | 1.5 | 6.8 | 10.7 | 3.6 | 14.5 | -0.8 | 63 | 29 |
| 3 | FIRST | 1013.1 | 1015.3 | 83.0 | 43.0 | 6.0 | 1.5 | 9.6 | 13.0 | 6.9 | 20.4 | 4.1 | 71 | 28 |
| | SECOND | 1016.2 | 1018.5 | 9.0 | 8.5 | 2.5 | 1.0 | 7.0 | 10.9 | 3.4 | 14.4 | 0.1 | 62 | 26 |

FIG. 13

ALLELOPATHY DATABASE

| | | GREEN ONIONS | WATERMELONS OR MELONS (CUCURBITACEAE) | CARROTS | FOXTAIL MILLET/MILLET | BARLEY/ WHEAT | SQUASH | WATERMELONS/ CUCUMBERS/ SQUASH(CUCURBITACEAE) | GARLIC OR ONIONS |
|---|---|---|---|---|---|---|---|---|---|
| | | onion | cucurbit | carrot | foxtail millet·millet | barley/wheat | squash | watermelon·cucumber·squash | garlic·onion |
| GREEN ONIONS | onion | 0 | 1 | 1 | 0 | 0 | 1 | 0 | 0 |
| WATERMELONS OR MELONS (CUCURBITACEAE) | cucurbit | 1 | 0 | 0 | 0 | 1 | 1 | 0 | 0 |
| CARROTS | carrot | 1 | 0 | 0 | 1 | 0 | 0 | 0 | 0 |
| FOXTAIL MILLET/MILLET | foxtail millet·millet | 0 | 0 | 1 | 0 | 0 | 0 | 0 | 0 |
| BARLEY/ WHEAT | barley/wheat | 0 | 1 | 0 | 0 | 0 | 1 | 0 | 0 |
| SQUASH | squash | 1 | 0 | 0 | 0 | 1 | 0 | 0 | 0 |
| WATERMELONS/ CUCUMBERS/ SQUASH(CUCURBITACEAE) | watermelon·cucumber·squash | 0 | 0 | 0 | 0 | 0 | 0 | 0 | 1 |
| GARLIC OR ONIONS | garlic·onion | 0 | 0 | 0 | 0 | 0 | 0 | 1 | 0 |

FIG. 14

| CROP ROTATION APTITUDE DATABASE | | | WATERMELONS OR MELONS (CUCURBITACEAE) | PEANUTS |
|---|---|---|---|---|
| | | | cucurbit | peanut |
| WATERMELONS OR MELONS (CUCURBITACEAE) | cucurbit | | 0 | 1 |
| PEANUTS | peanut | | 1 | 0 |

FIG. 16

OUTPUT OF SYMBIOTIC ALLELOPATHY

| | CELERY (celery) | CHILE PEPPER/SWEET PEPPER (chile pepper/sweet pepper) | CHINESE CABBAGE/NAPA CABBAGE/CHINESE LEAF/CHINESE LEAF LETTUCE (chinese cabbage/napa cabbage/chinese leaf/chinese leaf lettuce) | COMMON BEAN (common bean) | STORK'S BILL (stork's bill) | EDIBLE BURDOCK/GREATER BURDOCK/BEGGAR'S BUTTON (edible burdock/greater burdock/beggar's button) | SPINACH (spinach) | MUSKMELON (muskmelon) | TURNIP (turnip) |
|---|---|---|---|---|---|---|---|---|---|
| CORN (corn) | | | | | | | | | |
| WATERMELONS OR MELONS (CUCURBITACEAE) (cucurbit) | TOMATO (tomato) | NAPA CABBAGE (napa cabbage) | CUCUMBER (cucumber) | WHITE-EDGE MORNING-GLORY (white-edge morning-glory) | CABBAGE (cabbage) | SPINACH (spinach) | ONION (onion) | SQUASH (squash) | CELERY (celery) |
| SQUASH (squash) | CABBAGE (cabbage) | CHINESE CABBAGE/NAPA CABBAGE/CHINESE LEAF/CHINESE LEAF LETTUCE (chinese cabbage/napa cabbage/chinese leaf/chinese leaf lettuce) | TOMATO (tomato) | | CORN (corn) | KOMATSUNA/TURNIP LEAF/TURNIP GREEN/JAPANESE MUSTARD SPINACH (komatsuna/turnip leaf/turnip green/japanese mustard spinach) | RADISH (radish) | CORN (corn) | TURNIP (turnip) |
| BEAN (bean) | CHINESE CABBAGE/NAPA CABBAGE/CHINESE LEAF/CHINESE LEAF LETTUCE (chinese cabbage/napa cabbage/chinese leaf/chinese leaf lettuce) | | CELERY (celery) | | ROSE (rose) | | CORN (corn) | WHITE-EDGED MORNING-GLORY (white-edged morning-glory) | PARSLEY (parsley) |
| LETTUCE (lettuce) | TURNIP (turnip) | | CHILE PEPPER/SWEET PEPPER (chile pepper/sweet pepper) | | SOYBEAN (soybean) | | EDIBLE BURDOCK/GREATER BURDOCK/BEGGAR'S BUTTON (edible burdock/greater burdock/beggar's button) | | |
| CUCURBITACEAE (cucurbitaceae) | PEA (pea) | | CROWN DAISY (crown daisy) | | GRAPE (grape) | | STRAWBERRY (strawberry) | | |
| SWEET BASIL (sweet basil) | | | | | | | EDDO (eddo) | | |
| COMMON BEAN (common bean) | | | | | | | | | |
| STORK'S BILL (stork's bill) | | | | | | | | | |
| MUSKMELON (muskmelon) | | | | | | | | | |
| PARSLEY (parsley) | | | | | | | | | |
| SOYBEAN (soybean) | | | | | | | | | |
| WHITE-EDGED MORNING-GLORY (white-edged morning-glory) | | | | | | | | | |
| KOMATSUNA/TURNIP LEAF/TURNIP GREEN/JAPANESE MUSTARD SPINACH (komatsuna/turnip leaf/turnip green/japanese mustard spinach) | | | | | | | | | |
| LEAF VEGETABLE (leaf vegetable) | | | | | | | | | |

FIG. 20

REFERRING TO PREVIOUS FARM FIELD DATA

12 | 11
--- | ---
S101 ACQUIRE SELECTION OF LEVELS OF FIELDS | S141 RECEIVE INFORMATION REGARDING LEVELS OF SELECTED FIELDS
S102 RECEIVE AND DISPLAY LIST | S142 GENERATE AND OUTPUT LIST OF SELECTED FIELDS WITH LEVELS
S103 OUTPUT INFORMATION REGARDING FIELD SELECTED FROM LIST | S143 RECEIVE INFORMATION REGARDING SELECTED FIELD
 | S144 RETRIEVE DBS OF RECEIVED INFORMATION REGARDING FIELD
S104 RECEIVE LIST OF RETRIEVED DBS OF FIELD | S145 OUTPUT LIST OF RETRIEVED DBS
S105 DISPLAY RECEIVED LIST OF DBS OF FIELD | 
S106 ACQUIRE INFORMATION REGARDING COORDINATES OF FIELD AND DB TO BE REFERRED TO | 
S107 OUTPUT ACQUIRED INFORMATION | S146 RECEIVE ACQUIRED INFORMATION
 | S147 READ INFORMATION REGARDING FIELD AT DESIGNATED COORDINATES OF DESIGNATED DB
 | S148 OUTPUT READ INFORMATION REGARDING FIELD
S108 RECEIVE READ INFORMATION REGARDING FIELD | 
S109 DISPLAY RECEIVED INFORMATION REGARDING FIELD | 
S110 ACQUIRE INFORMATION REGARDING SELECTION OF DATE OF INFORMATION TO BE REFERRED TO | S149 RECEIVE INFORMATION REGARDING SELECTION OF DATE OF INFORMATION TO BE REFERRED TO
 | S150 READ INFORMATION REGARDING DESIGNATED DATE
S111 RECEIVE READ INFORMATION REGARDING DATE | S151 OUTPUT READ INFORMATION REGARDING DATE
S112 DISPLAY RECEIVED INFORMATION REGARDING DATE |

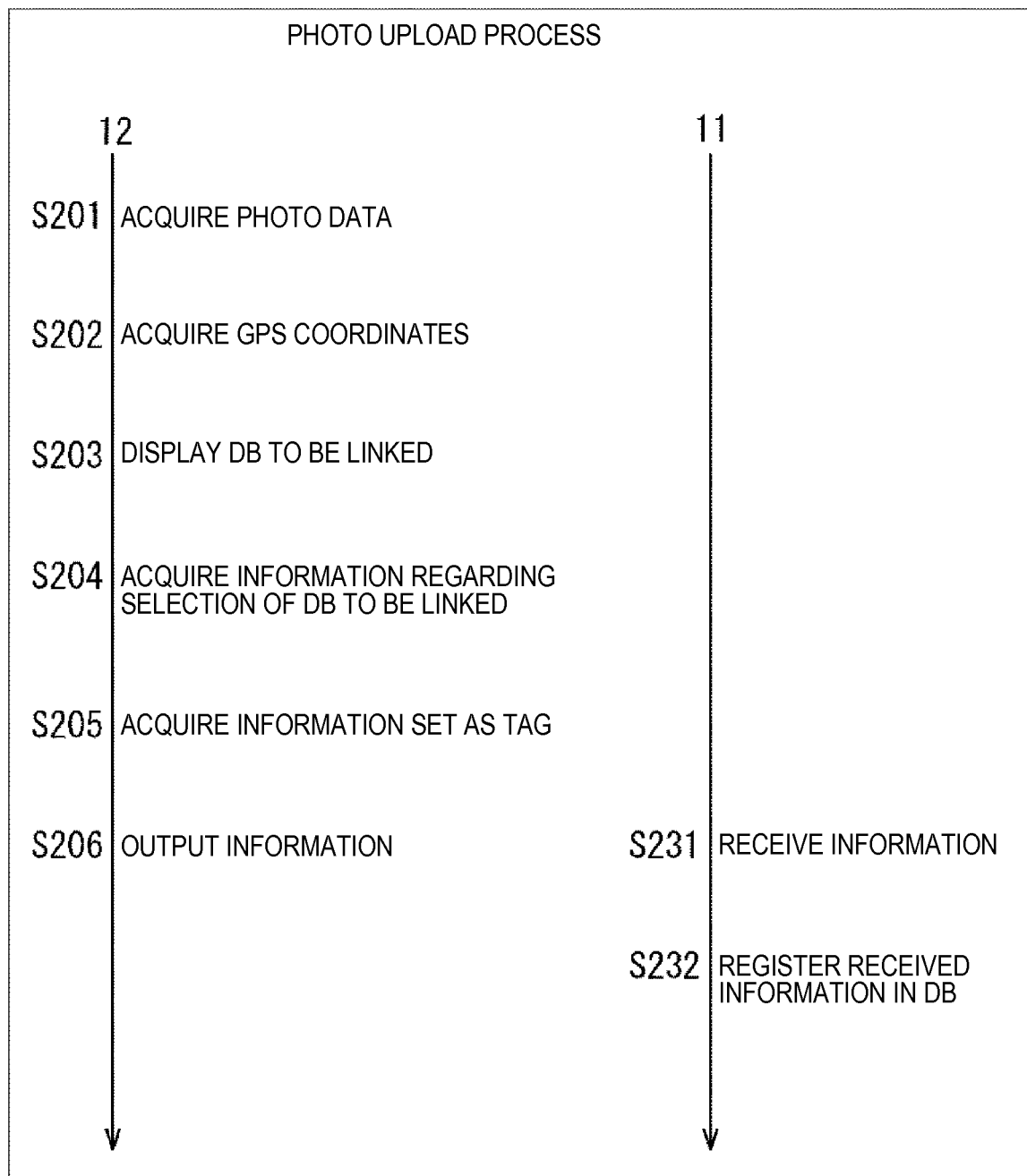

FIG. 22

PROCESS OF GENERATING CAUSE-AND-EFFECT ESTIMATION GRAPH OF KEY EVENT

12 | 11
--- | ---
S301 RECEIVE SELECTION OF KEY EVENT ICON |
S302 ACQUIRE PHOTO DATA AND DATE |
S303 ACQUIRE GPS COORDINATES |
S304 ACQUIRE INPUT TEXT |
S305 OUTPUT INFORMATION | S351 RECEIVE INFORMATION
 | S352 RECORD RECEIVED INFORMATION IN META-DB
 | S353 RECEIVE INFORMATION REGARDING SELECTED LEVELS OF FIELDS
S306 ACQUIRE INFORMATION REGARDING SELECTION OF LEVELS OF FIELDS | S354 GENERATE AND OUTPUT LIST OF FIELDS WITH SELECTED LEVELS
S307 RECEIVE AND DISPLAY LIST |
S308 OUTPUT INFORMATION REGARDING FIELD SELECTED FROM LIST | S355 RECEIVE INFORMATION REGARDING SELECTED FIELD
 | S356 RETRIEVE DBS OF RECEIVED INFORMATION REGARDING FIELD
S309 RECEIVE LIST OF RETRIEVED DBS OF INFORMATION REGARDING FIELD | S357 OUTPUT LIST OF RETRIEVED DBS OF INFORMATION REGARDING FIELD
S310 DISPLAY RECEIVED LIST OF DBS OF INFORMATION REGARDING FIELD |
S311 ACQUIRE INFORMATION REGARDING COORDINATES OF FIELD AND DB TO BE LINKED |
S312 OUTPUT ACQUIRED INFORMATION | S358 RECEIVE OUTPUT INFORMATION
 | S359 READ INFORMATION REGARDING FIELD AT DESIGNATED COORDINATES OF DESIGNATED DB
S313 RECEIVE READ INFORMATION REGARDING FIELD | S360 OUTPUT READ INFORMATION REGARDING FIELD
S314 OUTPUT COMMAND FOR LINK | S361 RECEIVE COMMAND FOR LINK
 | S362 LINK NEWLY RECORDED KEY EVENT TO DB OF DESIGNATED FIELD
S315 OUTPUT COMMAND TO GENERATE CAUSE-AND-EFFECT ESTIMATION GRAPH OF KEY EVENT | S363 GENERATE CAUSE-AND-EFFECT ESTIMATION GRAPH OF KEY EVENT
S316 DISPLAY CAUSE-AND-EFFECT ESTIMATION GRAPH OF KEY EVENT | S364 OUTPUT CAUSE-AND-EFFECT ESTIMATION GRAPH OF KEY EVENT

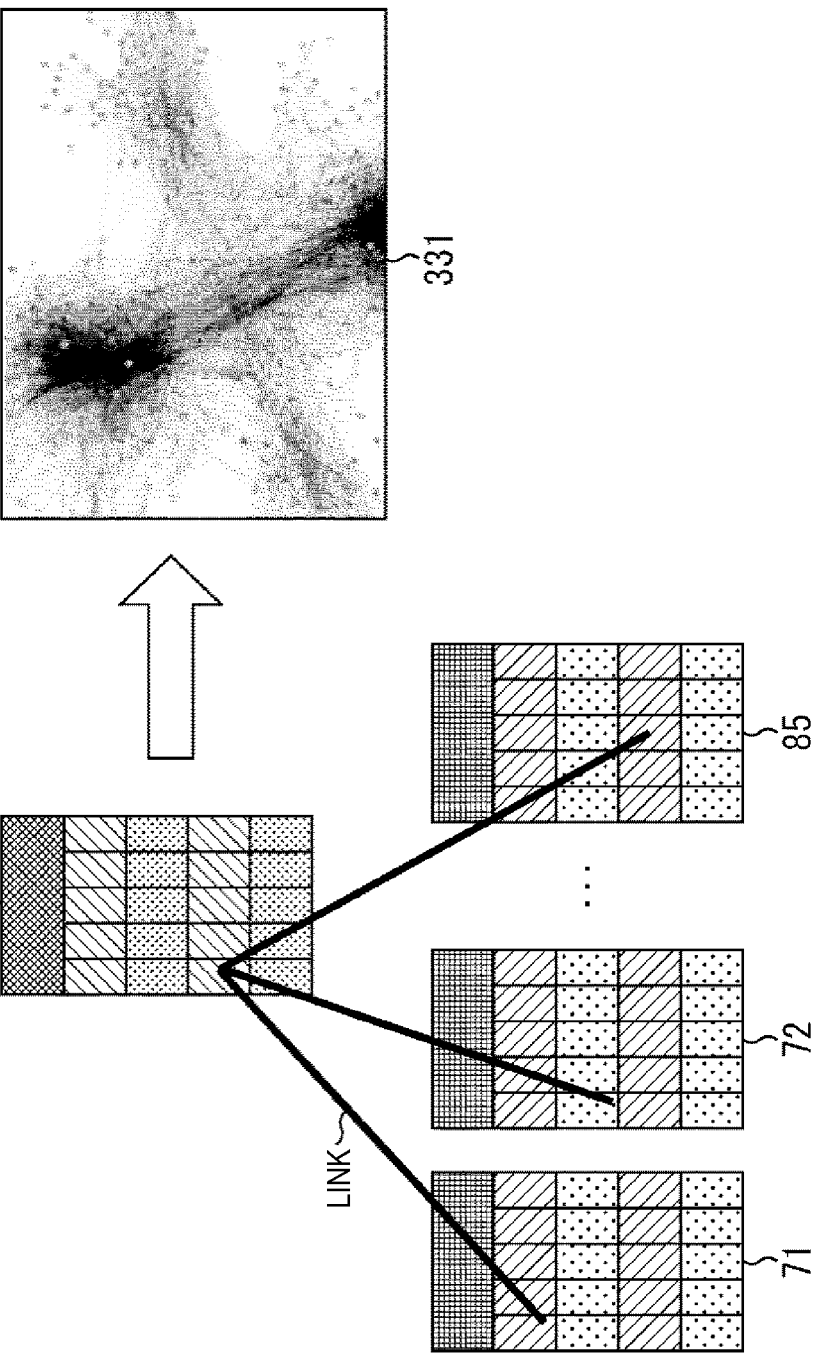

FARM WORK SUPPORT DEVICE AND METHOD, PROGRAM, RECORDING MEDIUM, AND FARM WORK SUPPORT SYSTEM

CROSS REFERENCES TO RELATED APPLICATIONS

The present application is a national stage of International Application No. PCT/JP2013/067364 filed on Jun. 25, 2013 and claims priority to Japanese Patent Application No. 2012-150172 filed on Jul. 4, 2012, the disclosure of which is incorporated herein by reference.

BACKGROUND

The present technology relates to a farm work support device and method, a program, a recording medium, and a farm work support system, and particularly, to a farm work support device and method, a program, a recording medium, and a farm work support system providing support so that a worker can determine an optimum vegetation combination.

In order to cultivate flowers, vegetables, or the like at home and obtain an outcome, for example, knowledge regarding cultivation such as selection of species, planting times, states of soil, kinds of fertilizers, fertilizer spreading times and methods, and watering times and methods are necessary. To nurture farm products in a farm field and sell the farm products as commercial goods, additional knowledge and experience regarding cultivation of an even greater depth regarding growing periods, weather conditions, and pesticide spraying are necessary. As a result, there are considerable differences in obtainable results between inexperienced workers and skilled workers.

Accordingly, devices supporting farm work have been suggested so that inexperienced workers can do proper farm work (for example, see Patent Literature 1).

In the farm work support device of Patent Literature 1, a plurality of seedlings of farm products are imaged with a camera so that at least one seedling to be thinned is included in a captured image. Then, a seedling to be thinned is specified from the plurality of seedlings in the captured image and thinning target information regarding the specified seedling to be thinned is output.

CITATION LIST

Patent Literature

Patent Literature 1: JP 2010-231733A

SUMMARY

Technical Problem

In the farm work support device of Patent Literature 1, however, the seedling to be thinned can only be specified based on the captured image and it is difficult to provide support so that the worker can determine a combination of vegetation proper for construction of a mixed and dense growth state.

The present technology is devised in view of such a circumstance and provides support so that a worker can determine an optimum vegetation combination.

According to an aspect of the present disclosure, there is provided a farm work support device including a reception unit configured to receive designation of plants to be cultivated, a retrieval unit configured to retrieve a vegetation design which is a vegetation combination proper for construction of a mixed and dense growth state of the designated plants, and an output unit configured to output the retrieved vegetation design.

An evaluation unit configured to evaluate a score of the retrieved vegetation design may be further provided, and the output unit may output the vegetation design corresponding to the score evaluated by the evaluation unit.

A calculation unit configured to calculate a score of the retrieved vegetation design may be further provided, and the evaluation unit may evaluate the score calculated by the calculation unit.

The output unit may output the vegetation design corresponding to the score of which a value is higher.

The retrieval unit may retrieve the vegetation design from at least one of allelopathy of the plants and information regarding crop rotation aptitude.

The score may be an average value of scores of the crop rotation aptitude and the allelopathy to which a collection of the plants corresponds.

The plants may be cultivated according to collaborative farming.

The plants may be managed based on GPS coordinates of vegetation positions of the plants.

A tag may be managed in conjunction with the GPS coordinates of the plants.

The tag may be displayed to be superimposed on an image of the plants as an AR tag.

A key event may be managed in conjunction with the GPS coordinates of the plants.

A photo of the plants may be managed in conjunction with the GPS coordinates of the plants.

The associated key event may be graphed.

A field in which the plants vegetate may be managed hierarchically.

The field may be managed on a map.

Solution to Problem

A method, a program, a recording medium, and a farm work support system according to an aspect of the present technology are the method, the program, the recording medium, and the farm work support system corresponding to the farm work support device according to an aspect of the present disclosure described above.

According to another aspect of the present disclosure, there is provided a farm work support device including a reception unit configured to receive designation of plants to be cultivated, an acquisition unit configured to acquire a vegetation design of the designated plants, and a display unit configured to display the acquired vegetation design.

The farm work support device may be carried and used in a field.

A photographing unit configured to photograph the plants may be further provided.

A detection unit configured to detect the GPS coordinates of vegetation positions of the plants may be further provided.

An input unit configured to input at least one of a tag conjunct with the GPS coordinates of the plants and a key event conjunct with the GPS coordinates of the plants may be further provided.

The display unit displays the tag to be superimposed on an image of the plants photographed by the photographing unit may be further provided.

The display unit hierarchically displays a field in which the plants vegetate may be further provided.

The display unit displays a position of the field on a map may be further provided.

The plants may be cultivated according to collaborative farming.

The display unit may display the vegetation design corresponding to evaluated scores.

The display unit may display the vegetation design corresponding to the scores of which a value is higher, and the input unit may designate the number of displayed scores of which the value is higher.

The display unit may display the vegetation design retrieved from at least one of allelopathy of the plants and information regarding crop rotation aptitude.

The score may be an average value of all elements of the crop rotation aptitude and the allelopathy to which a collection of the plants corresponds.

A method, a program, and a recording medium according to another aspect of the present technology are the method, the program, and the recording medium corresponding to the farm work support device according to another aspect of the present technology described above.

According to one aspect of the present technology, designation of plants to be cultivated is received, a vegetation design which is a combination of vegetation proper for construction of a mixed and dense growth state of the designated plants is retrieved, and the retrieved vegetation design is displayed.

According to another aspect of the present technology, designation of plants to be cultivated is received, a vegetation design of the designated plants is acquired, and the acquired vegetation design is displayed.

Advantageous Effects of Invention

As described above, according to the aspects of the present technology, it is possible to provide support so that a worker can determine an optimum vegetation combination Additional features and advantages are described herein, and will be apparent from the following Detailed Description and the figures.

BRIEF DESCRIPTION OF THE FIGURES

FIG. 5 is a diagram illustrating an example of the configuration of a planting database.

FIG. 6 is a diagram illustrating an example of the configuration of a vegetation database.

FIG. 7 is a diagram illustrating an example of the configuration of a yield database.

FIG. 8 is a diagram illustrating an example of the configuration of a management recording database.

FIG. 9 is a diagram illustrating an example of the configuration of a phenology database using text.

FIG. 11 is a diagram illustrating an example of the configuration of an insect and animal plexus database.

FIG. 12 is a diagram illustrating an example of the configuration of a weather database.

FIG. 13 is a diagram illustrating an example of the configuration of an allelopathy database.

FIG. 14 is a diagram illustrating an example of the configuration of a crop rotation aptitude database.

FIG. 16 is a diagram illustrating an output example of symbiotic allelopathy.

FIG. 20 is a diagram for describing a process when previous farm field information is referred to.

FIG. 21 is a diagram for describing a photo upload process.

FIG. 22 is a diagram for describing a process of generating a cause-and-effect estimation graph of a key event.

FIG. 23 is a diagram schematically illustrating the process of generating the cause-and-effect estimation graph of the key event.

DETAILED DESCRIPTION

Figure 1:
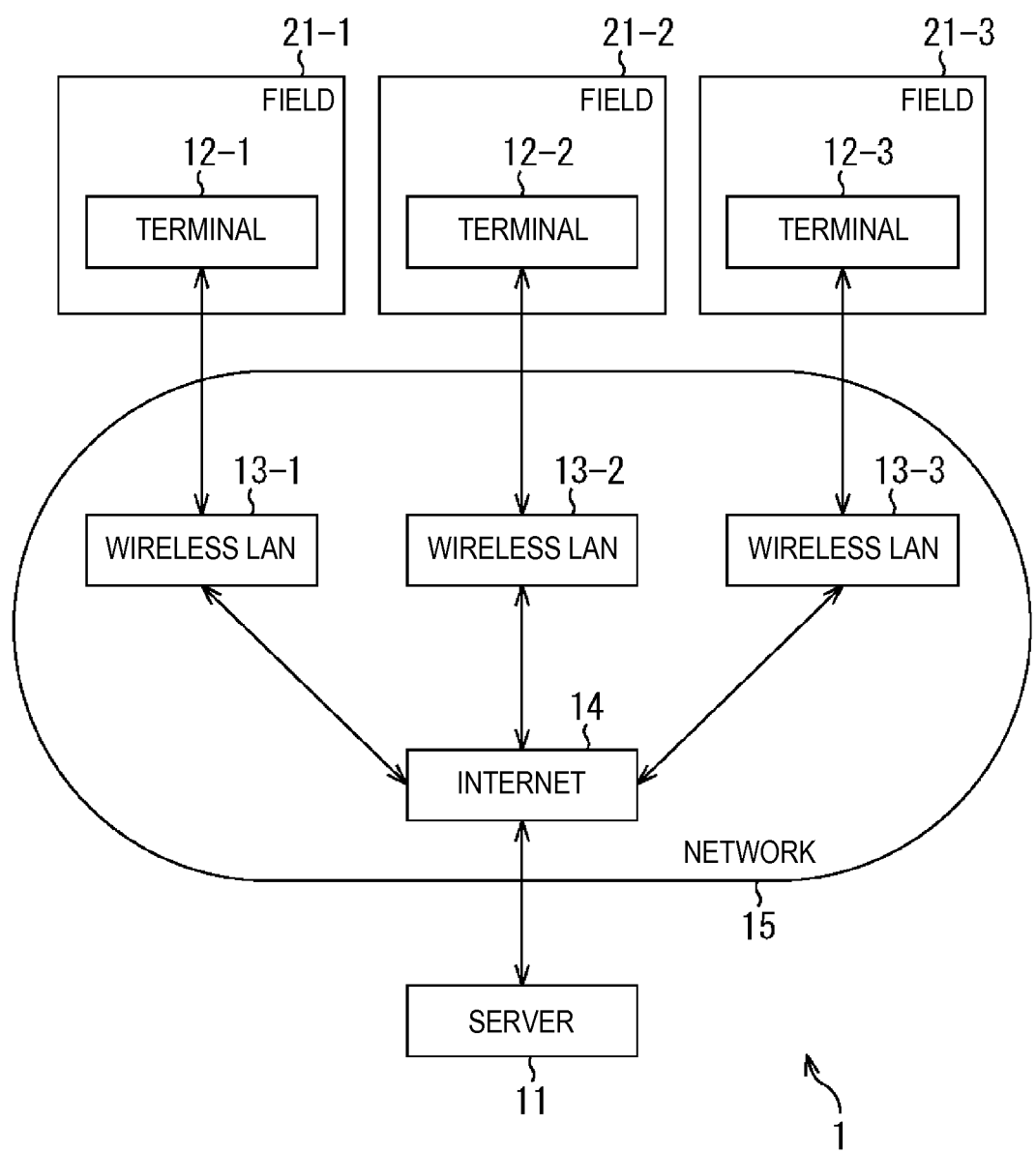
FIG. 1 is a block diagram illustrating the configuration of a farm work support system according to the present technology.

Hereinafter, modes (hereinafter referred to as embodiments) for carrying out the present technology will be described. The description will be made in the following order.

1. Configuration of farm work support system 1
2. Functional configuration of server 11
3. Functional configuration of terminal 12
4. Configuration of field 21-1
5. Example of database 55
6. Vegetation design support process
7. Farm work support system 1 using AR
8. Site map
9. Process of referring to previous farm field information
10. Photo upload process
11. Process of generating cause-and-effect estimation graph of key event
12. Example of meta-database 86 of key event
13. Others
14. Application of the present technology to program
15. Other configurations of the present technology

[Configuration of Farm Work Support System 1]

FIG. 1 is a block diagram illustrating the configuration of a farm work support system 1 according to the present technology. The farm work support system 1 is configured to include at least one server 11 and terminals 12-1 to 12-3 used in any number (three in the embodiment of FIG. 1) of fields 21-1 to 21-3.

When it is not necessary to distinguish the terminals 12-1 to 12-3 from each other, the terminals 12-1 to 12-3 are simply referred to as the terminals 12. The same also applies to fields 12-1 to 21-3, wireless LANs 13-1 to 13-3 to be described below, field divisions 151-1-1 and 151-1-2, ribs 152-1-1-1 to 152-1-2-2, rib divisions 153-1-1-1-1 to 153-1-2-2-4, and the like.

The terminal 12 is a farm work support device carried and used in the field 21 by a user (for example, a farmer) who receives support in farm work. The server 11 is a farm work support device used by a supporter supporting the user of the terminal 12.

The fields 21-1 to 21-3, which are farm fields, may be managed and used by different workers or may be managed and used by the same worker. Regions may be suburban areas or may be, for example, regions in Hokkaido or Kyushu of Japan or regions in distant regions of Japan, the USA, or the like. The number of terminals 12 used in the same field may be plural.

The terminal 12-1 is connected to the server 11 via the corresponding wireless local area network (LAN) 13-1 and the Internet 14. Likewise, the terminal 12-2 is connected to the server 11 via the corresponding wireless LAN 13-2 and the Internet 14 and the terminal 12-3 is connected to the server 11 via the corresponding wireless LAN 13-3 and the Internet 14. That is, the wireless LANs 13-1 to 13-3 have functions of connecting the terminals 12-1 to 12-3 used in the fields 21-1 to 21-3 to the Internet 14, respectively. In other words, the terminals 12 and the server 11 are connected via a network 15 formed by the wireless LANs 13 and the Internet 14. The network 15 may have any configuration. The terminal 12 can be configured as a tablet terminal with a camera.

[2. Functional Configuration of Server 11]

Figure 2:
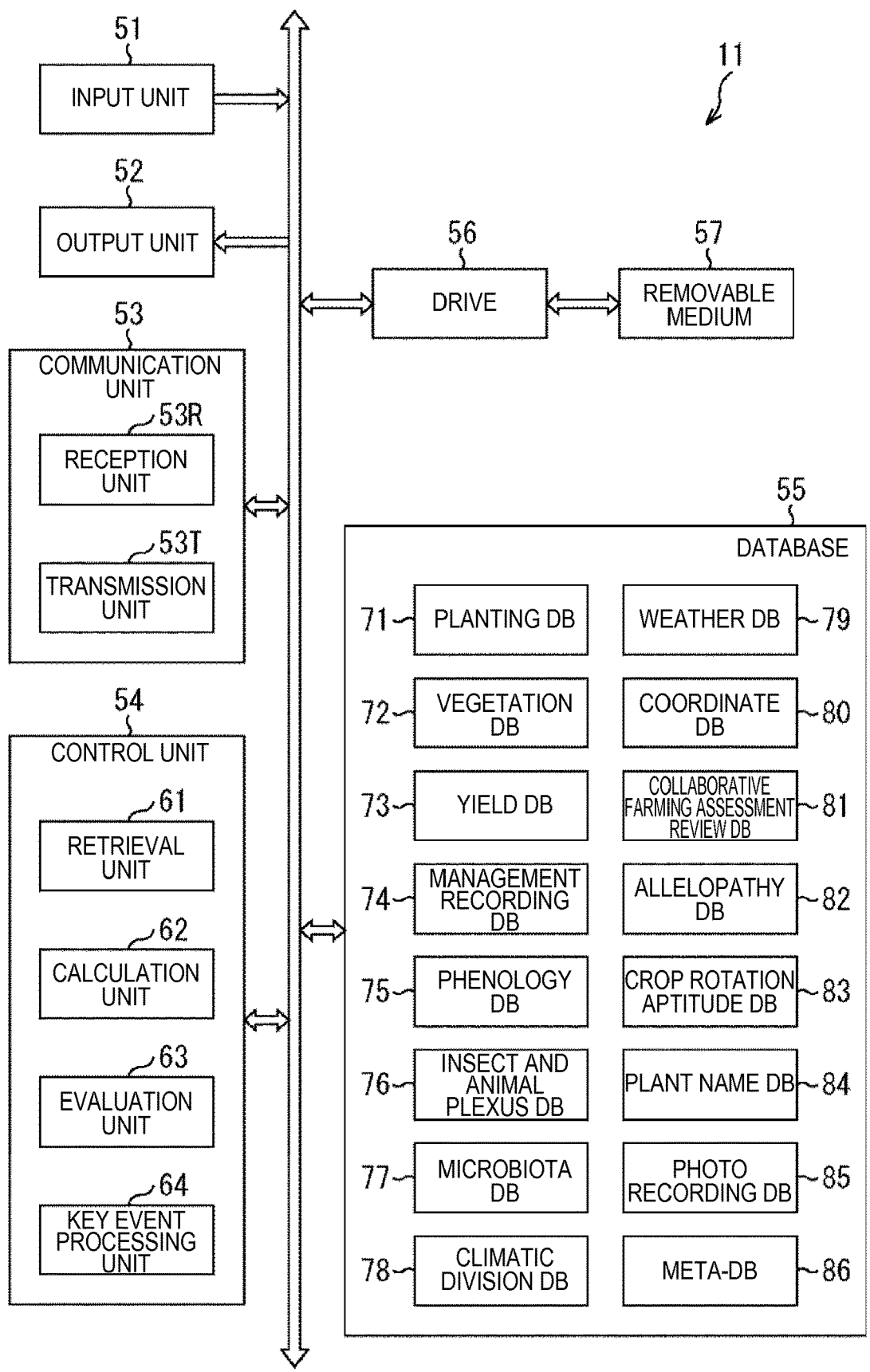
FIG. 2 is a block diagram illustrating a functional configuration of a server.

FIG. 2 is a block diagram illustrating a functional configuration of the server 11. The server 11 includes an input unit 51, an output unit 52, a communication unit 53, and a control unit 54. In the embodiment, the server 11 includes a database 55.

For example, by mounting a removable medium 57 serving as a package medium or the like on a drive 56, a program to be used by the control unit 54 can be provided to the control unit 54. Of course, the program may be installed in advance in a memory included in the control unit 54.

The input unit 51 is configured to include a keyboard or a mouse and is operated when a user inputs predetermined information. The output unit 52 is configured to include a liquid crystal display (LCD) or a cathode ray tube (CRT) and displays various kinds of information. The output unit 52 includes a speaker or the like to output audio. The communication unit 53 including a reception unit 53R and a transmission unit 53T performs communication with the Internet 14.

The control unit 54 is configured to include, for example, a microprocessor and controls each unit of the server 11 according to a predetermined program to perform a predetermined process. The control unit 54 includes functional blocks of a retrieval unit 61, an evaluation unit 63, and a key even processing unit 64.

The retrieval unit 61 performs a process of retrieving various kinds of information. The evaluation unit 63 performs an evaluation process for a calculation result or the like. The key event processing unit 64 performs a process for a key event.

The farm work support system 1 is proper when farm work mainly according to collaborative farming is supported. The collaborative farming refers to an agricultural system in which high yields are realized in total on the basis of thinning harvest from mixed and dense growth and species diversity exceeding natural states by vegetation placement under the conditions of no plowing, no fertilization, no pesticides and none is brought except for seeds and seedlings.

Since considerable amounts of knowledge should be considered in assessment of an achievement degree of the collaborative farming and at the time of management and harvest work, various databases (hereinafter simply abbreviated as DBs when necessary) that support management of the collaborative farming are prepared in the farm work support system 1.

A DB 55 includes a planting DB 71, a vegetation DB 72, a yield DB 73, a management recording DB 74, a phenology DB 75, an insect and animal plexus DB 76, a microbiota DB 77, a climatic division DB 78, a weather DB 79, and a coordinate DB 80. The DB 55 further includes a collaborative farming assessment review DB 81, an allelopathy DB 82, a crop rotation aptitude DB 83, a plant name DB 84, a photo recording DB 85, and a meta-DB 86.

In the DB 55, data is stored in a comma separated values (csv) file (for example, 2-dimensional matrix format file) or an image file. All or a part of the DB 55 can also be disposed independently from the server 11 and connected to the server 11 via the network 15. A part of the DB 55 can also be provided in the terminal 12. Further, a part of the DB 55 may be downloaded to the terminal 12 to be used. By doing so, the terminal 12 can be used at the field 21 where the terminal 12 may not be connected to the server 11. The details of the DB 55 will be described below with reference to FIGS. 5 to 14.

[Functional Configuration of Terminal 12]

Figure 3:
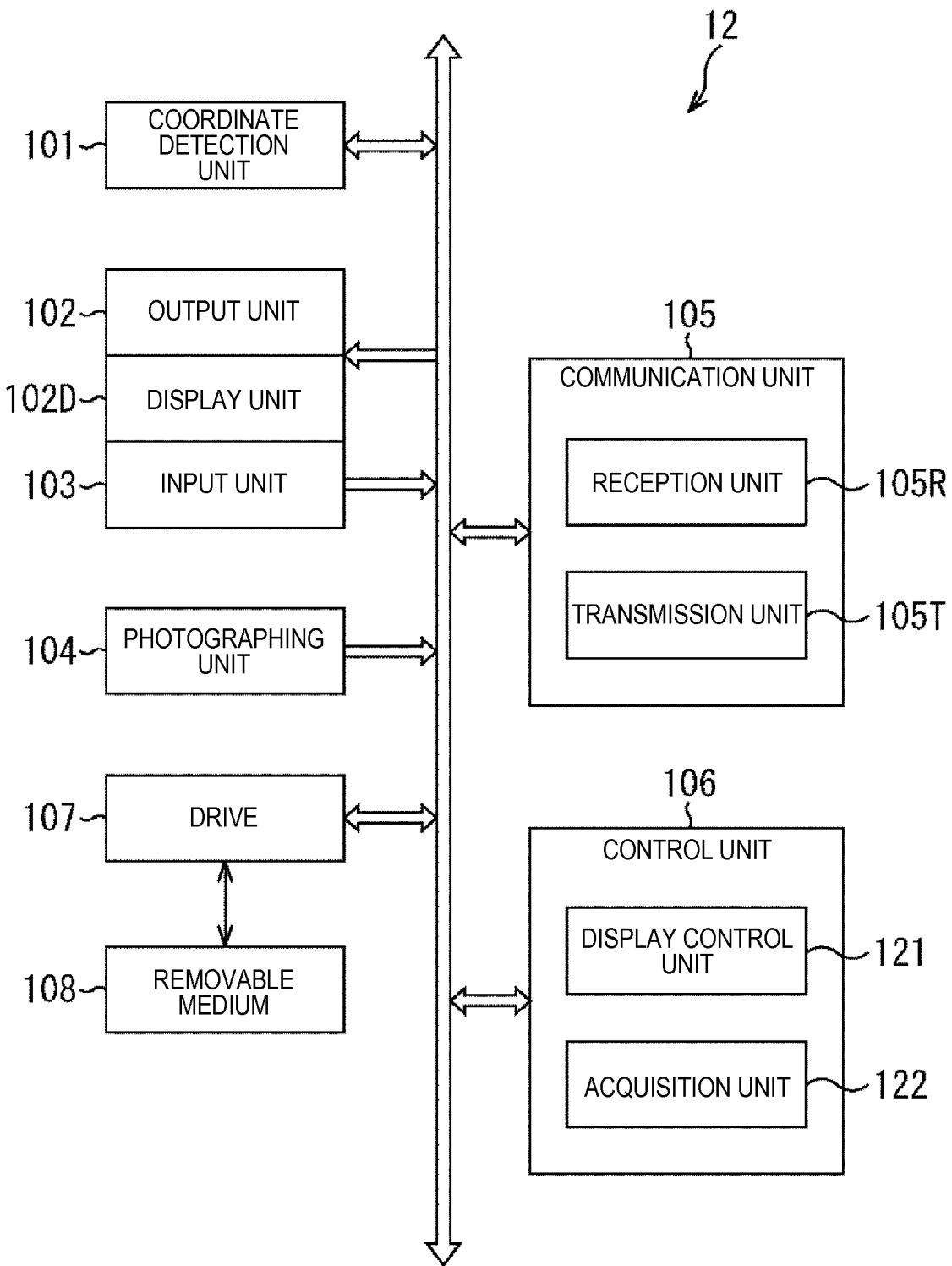
FIG. 3 is a block diagram illustrating a functional configuration of a terminal.

FIG. 3 is a block diagram illustrating a functional configuration of the terminal 12. The portable terminal 12 having a waterproof property to the extent of water resistance includes a coordinate detection unit 101, an output unit 102, an input unit 103, a photographing unit 104, a communication unit 105, and a control unit 106.

The coordinate detection unit 101 detects positional coordinates of the terminal 12 based on, for example, the Global Positioning System (GPS). The output unit 102 includes a display unit 102D configured to include, for example, an LCD and displays predetermined information. The output unit 102 includes a speaker or the like to output audio. The input unit 103 is configured to include, for example, a touch pad and inputs various kinds of information such as text, etc. by selecting icons, buttons, and the like displayed on the display unit 102D. The input unit 103 includes a microphone or the like to input audio.

The photographing unit 104 includes, for example, a camera and photographs any subject of a farm product and others. The photographing unit 104 can be configured to include, for example, a Real-Time Kinematics GPS unit with high precision. The communication unit 105 including a reception unit 105R and a transmission unit 105T has a communication function of, for example, wireless fidelity (WiFi) and performs wireless communication with the wireless LAN 13. Thus, the terminal 12 can communicate with the server 11 via the Internet 14. The control unit 106 is configured to include, for example, a microprocessor and controls various motions of the terminal 12 according to an installed program.

For example, by mounting a removable medium 108 serving as a package medium on a drive 107, the terminal 12 is configured to provide the control unit 106 with a program to be used by the control unit 106. Of course, the program may be installed in advance in a memory included in the control unit 106.

The control unit 106 includes a display control unit 121 and an acquisition unit 122 as functional blocks. The display control unit 121 controls display of a display unit 101D. The acquisition unit 122 acquires various kinds of information.

When all or a part of the DB 55 of FIG. 2 is provided on the side of the terminal 12 of FIG. 3, all or some of the retrieval unit 61, the evaluation unit 63, and the key event processing unit 64 of the control unit 54 in FIG. 2 are provided on the side of the terminal 12. However, by providing the DB 55 on the side of the server 11, the load of the portable terminal 12 can be lowered.

[Configuration of Field 21-1]

Figure 4:
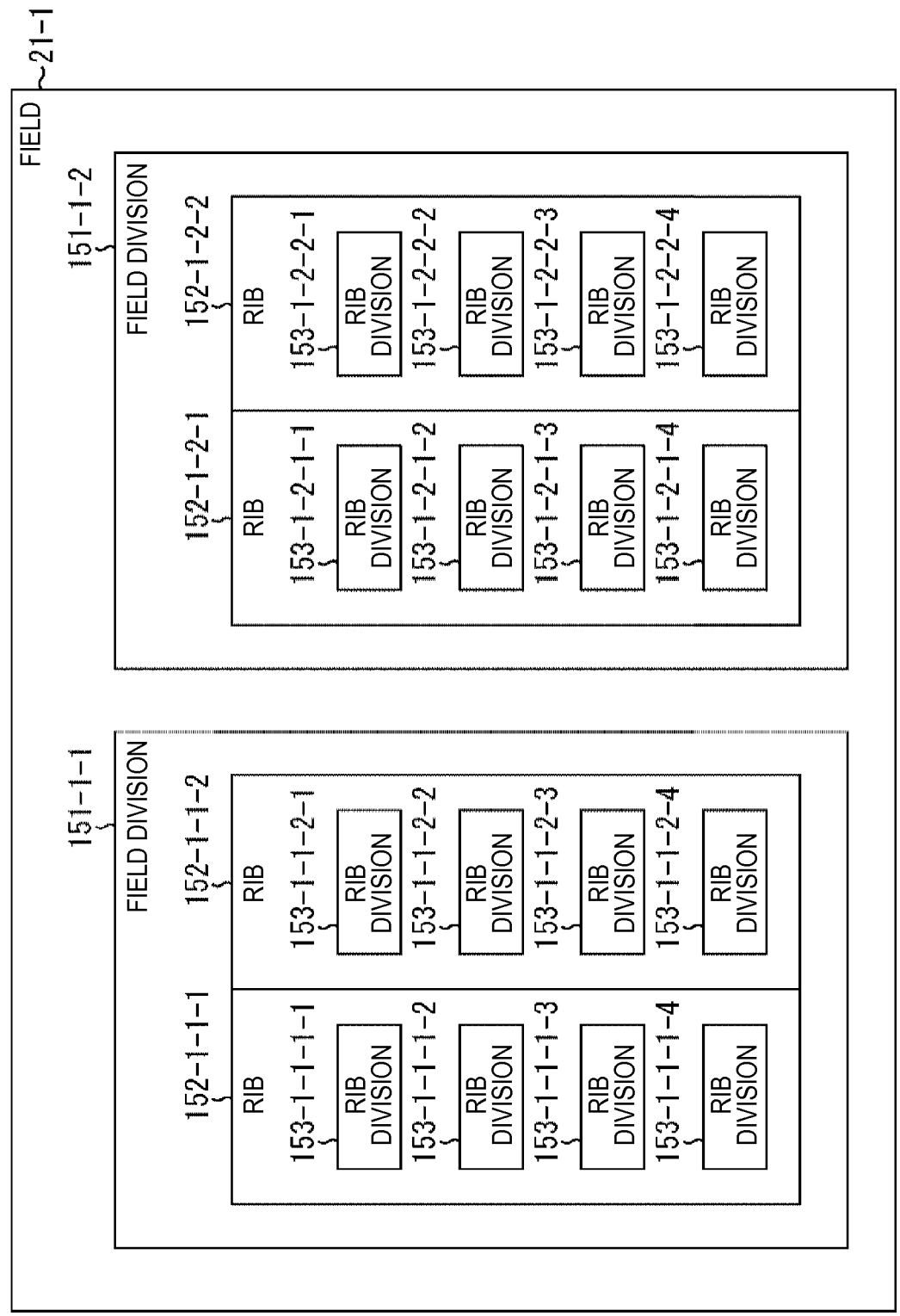
FIG. 4 is a diagram illustrating the configuration of a field.

FIG. 4 is a diagram illustrating the configuration of the field 21-1. Although not illustrated, the fields 21-2 and 21-3 or the like have the same configuration as the field 21-1. The field 21-1 is configured to include any number (two in FIG. 4) equal to or greater than one or more field divisions 151-1-1 and 151-1-2. The field division 151-1-1 is configured to include any number (two in FIG. 4) equal to or greater than one or more ribs 152-1-1-1 and 152-1-1-2. The rib 152-1-1-1 is configured to include any number (four in FIG. 4) equal to or greater than one or more rib divisions 153-1-1-1-1 to 153-1-1-1-4. Likewise, the rib 152-1-1-2 is also configured to include any number (four in FIG. 4) equal to or greater than one or more rib divisions 153-1-1-2-1 to 153-1-1-2-4. The rib 152-1-1-2 has the same configuration as the rib 152-1-1-1.

Although the description of the field division 151-1-2 is omitted, the field division 151-1-2 has the same configuration as the field division 151-1-1.

The GPS coordinates of the field 21, the field division 151, the rib 152, the rib division 153, and the like can be expressed as the coordinates of the middle of each region.

The farm field of the collaborative farming is different from previous farming and considerably various species coexist spatially, and thus it is necessary to optimally determine management harvest methods for the individual species according to each mutual interaction or previous and subsequent vegetation plans. Accordingly, the shapes of the field 21, the field division 151, the rib 152, the rib division 153, and the like may be regular rectangular shapes such as a square shape, a rectangular shape, or a linear shape, but the embodiment is not necessarily limited thereto. Any shape may be used.

[Example of DB 55]

Next, an example of the DB 55 will be described.

The planting DB 71 is configured to include, for example, csv files. FIG. 5 is a diagram illustrating an example of the configuration of the planting DB 71. In this example, information regarding recorded years, months, and days, the field divisions, the rib numbers, the rib divisions, distinction between seeds and seedlings, product names (written in kanji), product names (written in katakana), quantities, and makers are recorded. Since gathering and growing methods can be different for each maker despite the same kind of seeds and seedling and a maker name can be a kind of cultivation condition, it is desirable to manage and record the maker name.

For example, on Jan. 18, 2012, it is recorded that 0.5 kg of a seedling of a potato (May Queen) made by a maker A was planted in the ribs of all of the field divisions SW. Further, it is recorded that 2 bags of the seeds of lettuce (King Crown) made by a maker C are sown in all of the field divisions.

In the product name (written in kanji), information including a kind of species, "potato (Irish cobbler potato)," is recorded in kanji. However, in the product name (written in katakana), information regarding only a name, "potato," is recorded in katakana without distinguishing a kind of species. Such representation of only such unified text facilitates easy retrieval The vegetation DB 72 is configured to include, for example, csv files. FIG. 6 is a diagram illustrating an example of the configuration of the vegetation DB 72. In this example, recorded years, months, and days and measured division coordinates are recorded. For example, the following measurements are recorded at measured division coordinates NE. On Jan. 23, 2012, it is recorded that sprouts of fava beans are established, harvest of carrots is possible, harvest of radishes is possible, green onions are established, broccoli seedlings are established, cabbage seedlings are established, and napa cabbage seedlings are established and harvest thereof is possible.

It is recorded that weeds are observed in Poaceae, Asteraceae, and Leguminosae and harvest of red winding chicories is possible. For example, a predetermined plant can also be classified theoretically in more detail than Poaceae. However, it is not usually useful to classify the predetermined plant in further detail.

On Feb. 25, 2012, details measured at the measured division coordinates NE are recorded.

The yield DB 73 is configured to include, for example, csv files. FIG. 7 is a diagram illustrating an example of the configuration of the yield DB 73. In this example, the yields of the harvested products are recorded on harvested days of months. For example, 100 g of Horoniga lettuce is harvested on Jan. 14, 2012, and 1700 g, 4000 g, 1500 g, 740 g, and 1500 g of daikon are harvested on January 24, January 29, January 30, January 31, and February 20, respectively.

Furthermore, the yields of turnips, turnips of a W farm, Italian parsley, salad chives, mint, rosemary, komatsuna, Mu vegetable, green onions, radishes, radishes of the W farm, celery, burdock, bok choi, garland chrysanthemums, small *ginseng*, small *ginseng* of the W farm, large and medium *ginseng* of the W farm, cauliflower, cabbage (stem cabbage?), island Japanese leeks, green napa cabbage, and butterbur sprouts are recorded. "W farm" is the name of a farm and "stem cabbage?" indicates that an observer may not have precisely identified whether the cabbage is stem cabbage. "Mu vegetable" is not a general name but is a name for the plant coined by the observer. In FIG. 7, the recording of the coordinates is omitted, but the field 21, the field division 151, the rib 152, the rib division 153, the GPS coordinates, and the like can also be recorded.

When the yield DB 73 is input, input information regarding the planting DB 71 can be used. For example, when the yield DB 73 is input, information regarding plants managed by the planting DB 71 can be configured to be displayed without change.

The management recording DB 74 is configured to include, for example, csv files. FIG. 8 is a diagram illustrating an example of the configuration of the management recording DB 74. In this example, performed management work and the year, month, and day on which the management work is performed are recorded. For example, it is recorded that seedling planting and construction work such as wind protection fence making are performed on Jan. 19, 2012, Jan. 20, 2012, Jan. 21, 2012, Jan. 22, 2012, and Jan. 23, 2012.

The phenology DB 75 is configured to include, for example, image files and csv files. FIG. 9 is a diagram illustrating an example of the configuration of the phenology DB 75 using text. In this example, the content and the recording date of phenology are recorded with text. For example, it is recorded that an unclear kind of plant is observed, a plant grows better than others, lower portions of peas are withered, and a place at which plants apparently grow more than others is observed on Jan. 9, 2011.

Figure 10:
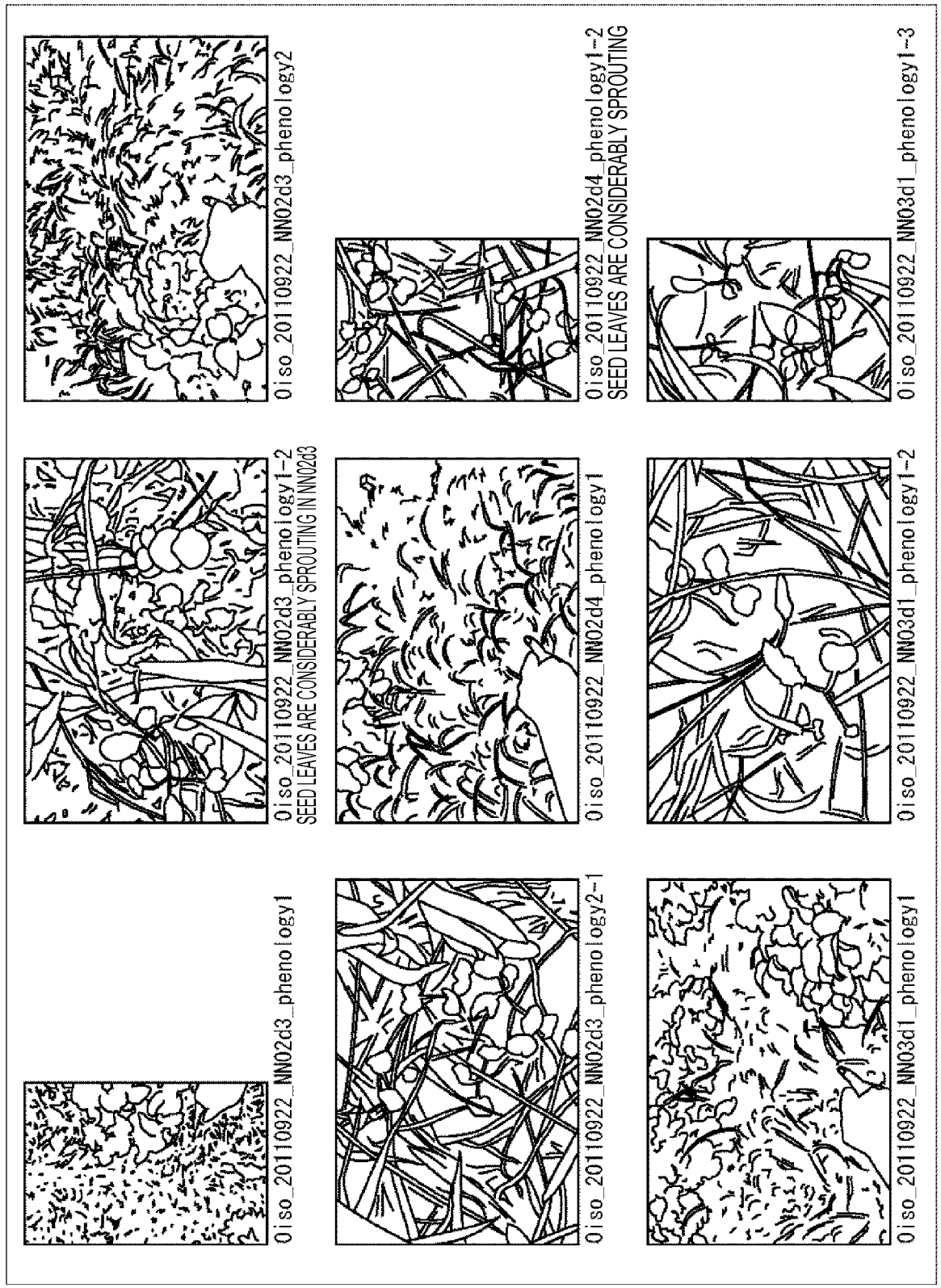
FIG. 10 is a diagram illustrating an example of the configuration of a phenology database using images.

On the other hand, FIG. 10 is a diagram illustrating an example of the configuration of the phenology DB 75 by images. In this example, phenology observed in a field with the name "Oiso Collaborative Farm" is recorded on each date along with photographed photos and simple added comments.

In the upper left of the drawing, phenology 1 which is an image photographed when a place is Oiso, a date is Sep. 22, 2011, a field division is NN, a rib number is 02, and a rib division is d3 is illustrated. In the upper middle of the drawing, phenology 1-2 which is an image photographed at the same place is illustrated along with a comment "Seed leaves are considerably sprouting in NN02d3."

In this way, the phenology DB 75 records the phenology observed by the worker using text and images.

The insect and animal plexus DB 76 is configured to include image files and csv files. FIG. 11 is a diagram illustrating an example of the configuration of the insect and animal plexus DB 76. In A of FIG. 11, an insect image photographed in a field 087 with the name of ISE New Farm on Feb. 18, 2012 is illustrated. As a comment, it is recorded that an observation place is ISE New Farm, an order of the insect is Coleoptera, a family of the insect is Tenebrionidae, the insect is classified as a darkling beetle, and the insect hibernates in groups under stones.

In B of FIG. 11, an insect image photographed in a field 088 with the name of ISE New Farm on Feb. 18, 2012 is illustrated. As a comment, the same content as that in A of FIG. 11 is recorded.

In C of FIG. 11, an image photographed in a field 089 with the name of ISE New Farm on Feb. 18, 2012 is illustrated. As a comment, it is recorded that an observation place is ISE New Farm, the animal is an arachnid, an order of the animal is Araneae, a family of the animal is Lycosidae, its binomial name is *Pardosa astrigera*, and this species is the most cosmopolitan species in the wolf spider family and is often observed wandering near the Earth's surface.

The microbiota DB 77 is configured to include image files and csv files. The microbiota DB 77 records information regarding microorganisms analyzed from soil samples acquired in a collaborative farm.

The climatic division DB 78 is configured to include csv files. The climatic division DB 78 is a DB that records information regarding climatic division in which a farm is located and is divided into laurel forests, deciduous forests, subtropical climate, tropical climate, and the like.

The weather DB 79 records, for example, image files graphed from weather data of a weather satellite such as AMeDAS, csv files, and various kinds of weather data obtained by measurement devices installed in a farm field.

FIG. 12 is a diagram illustrating an example of the configuration of the weather DB 79. In this example, weather information such as atmosphere, precipitation, temperature, and humidity in Tsu District in 2012 is recorded at the beginning, middle, and end of each month. For example, at the beginning of January, the average atmosphere of the local district is 1018.7 hPa and the average atmosphere of the sea level is 1021.0 hPa. The maximum precipitation is 0.5 mm during 10 minutes, 0.5 mm for 1 hour, and 0.5 mm during 1 day, and a total is 0.5 mm. The highest temperature is 11.6° C. and the lowest temperature is 0.2° C., the highest average of 1 day is 9.2° C., the lowest average of 1 day is 2.0° C., and the average of a day is 5.2° C. An average humidity is 62% and the lowest humidity is 24%.

The coordinate DB 80 is configured to include csv files. The coordinate DB 80 records the GPS coordinates of each rib of the field. The coordinates have precision of about 10 centimeters.

The collaborative farming assessment review DB 81 is configured to include pdf or image files. The collaborative farming assessment review is a certificate issued when evaluation of collaborative forming is completed and is issued when a server manager evaluates a field based on a request from a manager of the field 21 and confirms that conditions of the collaborative farming are satisfied. The fact that products from the farm receiving the issue are produced according to the collaborative farming is recognized to be recorded.

The allelopathy DB 82 is configured to include, for example, csv files. FIG. 13 is a diagram illustrating an example of the configuration of the allelopathy DB 82. In this example, allelopathy of green onions, watermelons or melons (Cucurbitaceae), carrots, foxtail millet/millet, barley/wheat, squash, watermelons/cucumbers/squash (Cucurbitaceae), and garlic or onions is recorded. Here, "1" means that symbiotic interaction (that is, a stimulation action) between target plants is confirmed and "0" means that the symbiotic interaction is not confirmed. For example, the symbiotic interaction is confirmed between green onions and carrots, but the symbiotic interaction between green onions and barley/wheat is not confirmed. Further, the degree of the interaction can be expressed step by step using numerals 0 to 10 or the like.

The crop rotation aptitude DB 83 is configured to include csv files. FIG. 14 is a diagram illustrating an example of the configuration of the crop rotation aptitude DB 83. In this example, crop rotation aptitude of watermelons or melons (Cucurbitaceae) and peanuts is recorded. Here, "1" means that excellent crop rotation aptitude between target plants is confirmed in that field and "0" means that the crop rotation aptitude is not confirmed. For example, excellent crop rotation aptitude between watermelons or melons (Cucurbitaceae) and peanuts is confirmed.

The allelopathy DB 82 and the crop rotation aptitude DB 83 are generated not only from information known from documents or the like but also from other information. For example, comparing and referring to the planting DB 71, the vegetation DB 72, and the yield DB 73, the allelopathy DB 82 and the crop rotation aptitude DB 83 can also be generated in the same form from a combination of vegetation in which a mixed growth state is actually established in a collaborative farm or a combination in which vegetation succession (that is, a change in temporal vegetation) occurs.

The plant name DB 84 records the names and images of various plants. The photo recording DB 85 records various photos. The meta-DB 86 records key events.

The DB 55 records various kinds of information necessary to obtain the vegetation design of plants cultivated in the collaborative farm in addition to the foregoing information.

[Vegetation Design Support Process]

Next, a process when the farm work support system 1 supports the vegetation design will be described. In the farm work support system 1, when a user inputs crops which the user desires to cultivate, a combination of vegetation proper for construction of the mixed and dense growth state and these crops, i.e., a vegetation design, is retrieved from the allelopathy DB 82 and the crop rotation aptitude DB 83. Then, a time and space arrangement of the vegetation design expected to have the lowest cost and largest yields is output.

Since the collaborative farming is based on the mixed and dense growth, a plurality of seeds of crops can be planted in a mixed manner and growing crops are harvested. High achievement of the degree of mixed and dense growth and a combination of seeds to be sown depend on appropriate plants and land conditions. Thus, it is necessary to expect the appropriate plants and the land condition from both of the previously known interaction between the plants (allelopathy or crop rotation aptitude) and a combination that is effective in practice in a farm field.

Since an ecosystem or weather can rarely be completely controlled, planted seeds or planted seedlings may not all be harvested. However, to estimate a vegetation combination realizing as much cost reduction and quantity maximization as possible is a task of the vegetation design. Since the vegetation design is conceptually similar to constitution of a portfolio in stock investment, the vegetation design can be called a seed portfolio.

Figure 15:
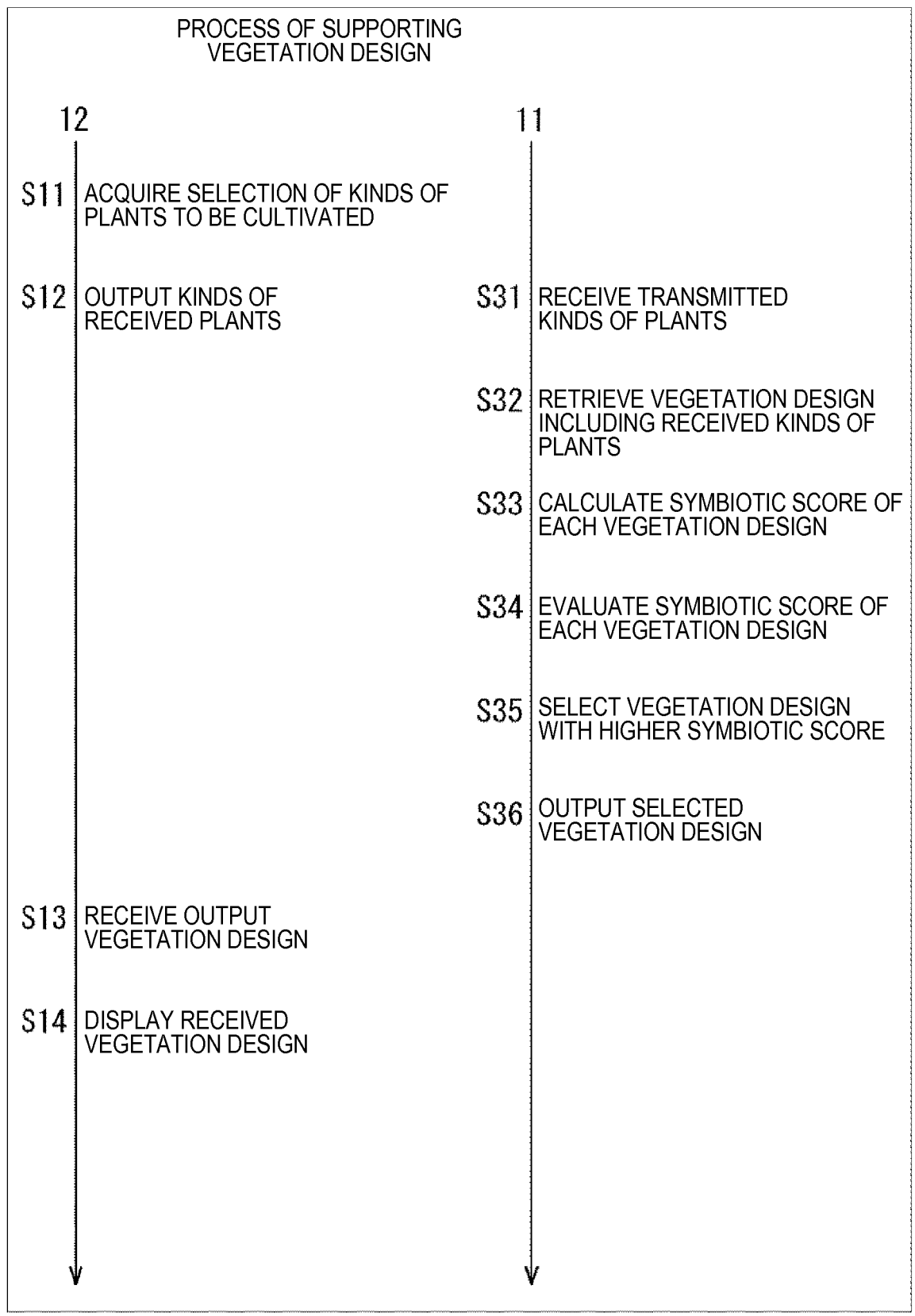
FIG. 15 is a diagram for describing a process of supporting a vegetation design.

FIG. 15 is a diagram for describing a process of supporting the vegetation design. As illustrated in the drawing, in step S11, the acquisition unit 122 of the control unit 106 of the terminal 12 acquires selection of the kinds of plants to be cultivated. That is, when the user operates the input unit 103 to designate the kinds of plants to be cultivated, the kinds of plants are acquired by the acquisition unit 122. When the kinds of plants are input, a method of causing the user to input any plant name may be performed or a prepared list of plant names may be displayed by the display unit 102D and predetermined plant names may be selected from the plant names. In this way, the designation of the plants to be cultivated is received.

In step S12, the transmission unit 105T outputs the kinds of received plants. That is, the transmission unit 105T outputs the plant names acquired in step S11. The plant names are supplied to the server 11 via the wireless LAN 13 and the Internet 14.

In step S31, the reception unit 53R of the server 11 receives the transmitted kinds of plants. That is, the kinds of plants transmitted from the terminal 12 in step S12 are received by the server 11. Thus, the plants to be cultivated by the user are received by the server 11. In step S32, in the server 11, the retrieval unit 61 of the control unit 54 retrieves the vegetation design including the received kinds of plants. That is, the retrieval unit 61 exclusively retrieves a combination of vegetation proper for the construction of the mixed and dense growth state and the plants designated by the user from at least one of the allelopathy DB 82 and the crop rotation aptitude DB 83. When the received kinds of plants are confirmed, the plant name DB 84 is also used as necessary.

In step S33, the calculation unit 62 calculates a symbiotic score of each vegetation design retrieved in step S32. That is, the symbiotic score of each combination of vegetation which is one or more vegetation designs retrieved in step S32 and is proper for the construction of the mixed and dense growth and the designated plants is calculated.

The symbiotic score is defined as an average value of all of the elements recorded in the allelopathy DB 82 and the crop rotation aptitude DB 83 corresponding to a collection of the kinds of plants desired to be planted. All of the elements are weighted scores of all kinds of plants and the weighted scores are values obtained by evaluating the interaction of the plants as positive or negative numerical values. That is, the symbiotic score SC is expressed by the following equation on the assumption that n is the number of weighted scores of all of the plants and Ei is the value of the weighted score of an i-th (where i=1, 2, . . . , n) plant. Further, the value Ei of the weighted score is a value which is larger when the degree of aptitude for the construction of the mixed and dense growth state is larger.

$$SC = \Sigma Ei/n \quad (1)$$

A larger value of the symbiotic score means that the symbiotic interaction is stronger, i.e., there is an empirical rule that the symbiotic interaction is strong. A smaller value (or a larger negative value) means that competitive interaction is strong.

In the allelopathy DB 82 and the crop rotation aptitude DB 83, the value of the weighted score obtained by evaluating the interaction as a positive or negative numerical value is recorded for each combination of the kinds of plants generated from a document and farm field data. That is, the vegetation state of the kinds of planted plants recorded in the planting DB 71 is recorded in the vegetation DB 72 and the yields obtained from the plants are recorded in the yield DB 73. Whenever the weighted scores of the plants are observed, the plants are added to the planting DB 71, the vegetation DB 72, and the yield DB 73. Finally, larger weighted scores are given when the yields in the combinations are larger. Even for the crop rotation aptitude DB 83, larger weighted scores are similarly recorded in combinations of the plants proper for the crop rotation. The symbiotic scores based on the weighted scores are recorded in the allelopathy DB 82.

For example, when peanuts are designated, as the symbiotic score of the peanuts with watermelons, which are one of the other plants recorded as a combination target with the peanuts, an average value of the weighted scores for elements such as various conditions and results when both the peanuts and the watermelons vegetate in the mixed and dense growth state is calculated. When the yield is large, a large weighted score is allocated to the element. When the yield is small, a small weighted score is allocated. Such an average value is calculated and is considered as a symbiotic score. The calculation may be performed whenever a plant is designated or may be automatically performed at a predetermined timing.

When all of the integrated values in the allelopathy DB 82 and the crop rotation aptitude DB 83 are used for the calculation of the symbiotic scores, cases of changes in the kinds of plants easily growing each year may be averaged by vegetation succession. Accordingly, evaluation can be performed even with a symbiotic score which is an average value of variable time differences partitioned to the degree of the latest several years. In consideration of this, correspondence to and use of the vegetation succession can be made.

In step S34, the evaluation unit 63 evaluates the symbiotic score of each vegetation design retrieved in step S31. That is, the symbiotic score of each vegetation design including the designated plants is compared.

In step S35, the evaluation unit 63 selects the vegetation design with a higher symbiotic score. That is, at least one combination of the kinds of plants in which the value of the symbiotic score evaluated in step S34 is large is selected in descending order.

When all of the retrieved vegetation designs are presented to the user without change, the processes of evaluating the symbiotic scores and selecting the vegetation design with the higher value of the symbiotic score can be omitted.

When the user is allowed to evaluate the symbiotic scores, the processes of evaluating the symbiotic scores and selecting the vegetation design with the higher value of the symbiotic score can be omitted.

In step S36, the transmission unit 53T outputs the selected vegetation design. That is, the vegetation design selected in step S35 is supplied via the Internet 14 and the wireless LAN 13 to the terminal 12 having transmitted the kinds of plants received in step S31 to the server 11.

In step S13, the reception unit 105R of the terminal 12 receives the vegetation design output from the server 11.

Accordingly, the vegetation design of the plants designated by the user in step S11 is acquired. In step S14, the display control unit 121 of the control unit 106 displays the received vegetation design. That is, the vegetation design acquired in step S13 is output to the display unit 102D.

Accordingly, the user can know each combination of the vegetation proper for the construction of the mixed and dense growth state and the kinds of plants input in step S11. The user can select a predetermined combination from the combinations suggested and displayed by the farm work support system 1 to actually cultivate the plants in the field 21. Since the displayed combination is each combination of the vegetation proper for the construction of the mixed and dense growth state and the kinds of plants designated by the user, the plants can be reliably cultivated. As a result, cost can also be lower than when plants are cultivated in a random combination. However, the information presented to the user is not predicted information. The information is reference information of prediction based on the previous empirical rule. The prediction is made by the user based on the reference information.

Since plants vegetate in the mixed and dense growth state in the collaborative farming, a good result may not be obtained even when farm work is formulated in several forms and any one of the forms is selected, as in the case of monoculture in which a cultivation area is divided for each plant. In the farm work support system 1, a new combination can be proposed to a user based on observation of the user. For example, when the user finds that symbiotic interaction is strong in a combination of certain vegetation and insects, a vegetation design can be performed using the combination.

Further, in the farm work support system 1, a plurality of kinds of plants vegetate in the mixed and dense growth state. Therefore, a risk can be dispersed compared to when only one kind of plant is cultivated, and thus many yields can be obtained on average. This is why the vegetation design of the farm work support system 1 is called a seed portfolio. Accordingly, the user can be allowed to designate the number of high-order combinations to be presented. Of course, the user can also be allowed to suggest the number of more proper plants. Thus, risk management can be performed.

FIG. 16 is a diagram illustrating an output example of symbiotic allelopathy. FIG. 16 illustrates a display example of step S14 in FIG. 15. In FIG. 16, 10 kinds of plants shown in the uppermost row and plants (that is, companion plants) proper for the construction of the mixed and dense growth state are shown in the lower rows. For example, plants proper for the construction of the mixed and dense growth state with corn are watermelons or melons (Cucurbitaceae), squash, beans, lettuce/salad vegetables, Cucurbitaceae, sweet basil, common beans, geraniums, melons, parsley, soybeans, white edge morning glory, komatsuna, and leaf vegetables. Further, plants proper for the construction of the mixed and dense growth state with celery are tomatoes, cabbage, napa cabbage, turnips, and peas.

That is, when the user inputs a plant name in the uppermost row, the plant names shown in the lower rows are displayed as the plant proper for the construction of the mixed and dense growth state. Accordingly, the user can select at least one plant from the displayed plants to vegetate the plant along with the designated plants in the mixed and dense growth state.

In the example of FIG. 16, only the plant names are shown, but the corresponding symbiotic scores may be sequentially displayed together in descending order.

[Farm Work Support System 1 Using AR]

In the collaborative farming, a vast amount of information has to be processed in the job field since it is necessary to ultimately perform vegetation management with precision of each plant in a farm field, for example, vegetation management regarding which vegetables remain and which grasses are cut down. Accordingly, in the farm work support system 1, augmented reality (AR) is adopted for a process of eliminating the amount of information without regard to a difference in an individual ability.

When an AR technology is used outside, two methods, i.e., a method of using markers for image recognition and a marker-less method of using objects in landscape as markers, are considered. However, when markers are installed, the markers may interfere with work. Conversely, when the marker-less method is used, recognition precision is not sufficient for physical movement necessary in farm work. That is, it is difficult to recognize an image when a worker is working (to recognize the markers in a natural image) and it is difficult to substantially perform farm work.

Accordingly, the farm work support system 1 performs tagging based on the GPS coordinates on information recorded in the DB 55. Then, by designating the GPS coordinates, the terminal 12 reads information corresponding to the GPS coordinates. As the GPS, for example, a GPS (for example, RTK-LIB) capable of recognizing positional information with a precision of 10 centimeters can be used.

Specifically, a species name can be tagged to predetermined GPS coordinates of each vegetable actually vegetating, information regarding planting or management work can be tagged for each rib of predetermined GPS coordinates, or predetermined information can be tagged to indigenous vegetation of predetermined GPS coordinates. By using this technology, information processing necessary for management of the collaborative farming can be performed with only the terminal 12 reading AR information without installing the markers or the like at all in an actual farm field.

Figure 17:
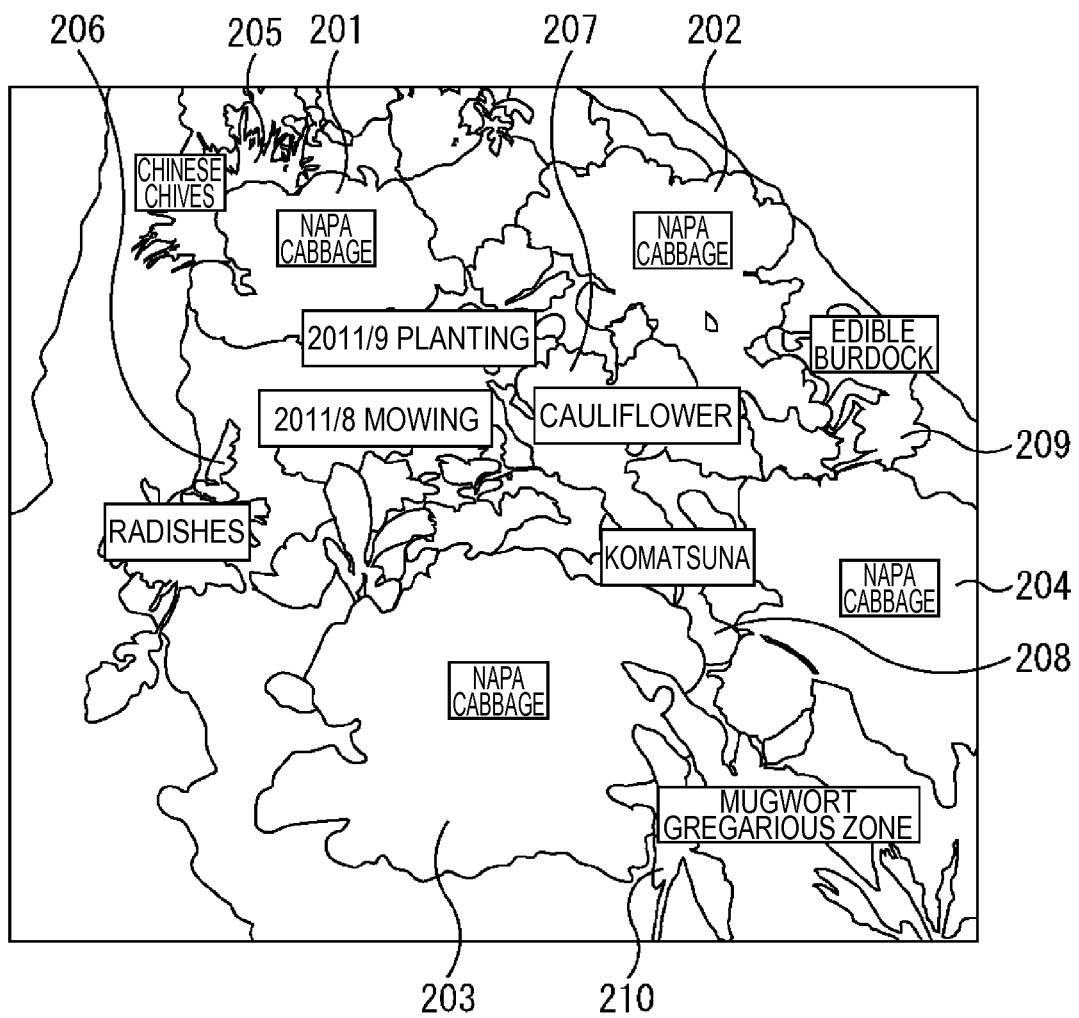
FIG. 17 is a schematic diagram illustrating a display example of an AR tag.

FIG. 17 is a schematic diagram illustrating a display example of an AR tag. A tag is actually displayed in a superimposed manner on a real-world image of a moving image or a still image obtained through photographing by the photographing unit 104. In FIG. 17, however, vegetables of the real world are schematically shown for easy understanding. A tag with a plurality of attributes can be displayed for each attribute or in a superimposed manner.

In the display example of FIG. 17, the user performs mowing in August 2011 and performs planting in September 2011 in this place. Information regarding which seeds is planted is recorded in the management recording DB 74 in association with the tag of the planting. At present, napa cabbage, Chinese chives, radishes, cauliflower, komatsuna, and edible burdock vegetate in this place.

As illustrated in FIG. 17, napa cabbage 201 to 204, Chinese chives 205, radishes 06, cauliflower 207, komatsuna 208, edible burdock 209, and a mugwort gregarious zone 210 vegetate at positions indicated by predetermined GPS coordinates of each field 21. These plants are recorded and managed in the vegetation DB 72 along with the tags of the napa cabbage, the Chinese chives, the radishes, the cauliflower, the komatsuna, the edible burdock, and the mugwort gregarious zone added by the user so that the plants are specified by the GPS coordinates.

That is, when the user observes such plants and operates the input unit 103 to input the names of the plants as tags, the tags are added to the plants vegetating at the GPS coordinate positions and managed. When the user photographs a predetermined plant of the field 21 using the photographing unit 104, its image is displayed on the display unit 102D. Further, when a predetermined instruction is input, as illustrated in FIG. 17, a corresponding tag is displayed to be superimposed on the image of the actual plant at the GPS coordinates. The mugwort gregarious zone 210 does not correspond to plants vegetating as the result of the user planting the seeds, but to indigenous plants. However, a tag is added to the mugwort gregarious zone 210 as indigenous vegetation information by the user.

The plants to vegetate are changed depending on a period, and the tags are managed by adding years, months, and days.

[Site Map]

Figure 18:
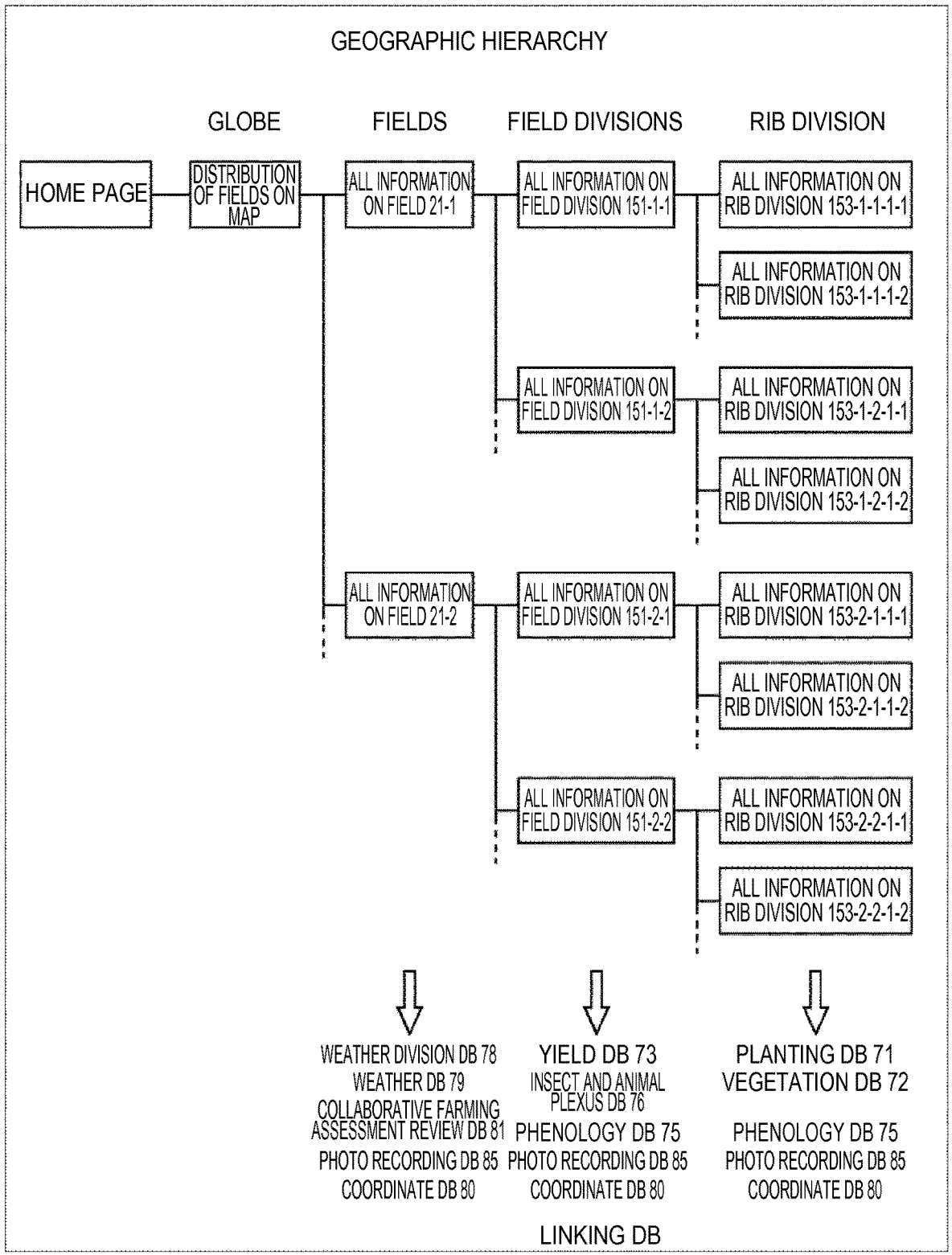
FIG. 18 is a diagram illustrating an example of a web page.

The server 11 supplies the user of the terminal 12 with a web page linked according to geographic hierarchy illustrated in FIG. 18 in the DB 55. An icon used to select the DB 55 is displayed on the web page for an operation from the touch panel of the terminal 12.

FIG. 18 is a diagram illustrating an example of the web page. As illustrated in the drawing, the web page is configured with the hierarchy of a home page, a distribution of fields on a map, all information on fields, all information on field divisions, and all information on rib divisions in the order of the high-level hierarchy to the low-level hierarchy. The hierarchy of the home page, the distribution of the fields on the map, all of the information on the fields, all of the information on the field divisions, and all of the information on the rib divisions correspond to the geographic hierarchy of the fields 21, the field divisions 151, and the rib divisions 153. Accordingly, the display unit 102D of the output unit 102 outputs and displays the fields 21 according to the hierarchy structure. For example, the user can select screens of the field divisions 151-1-1, 151-1-2, etc. from the screen of the field 21-1 and can select screens of the rib divisions 153-1-1-1-1, 153-1-1-1-2, etc from the screen of the field division 151-1-1. Hierarchy of the ribs 152 may also be provided, but is omitted in this example.

All of the information on the fields links to the weather division DB 78, the weather DB 79, the collaborative farming assessment review DB 81, the photo recording DB 85, and the coordinate DB 80 recording the GPS coordinates. All of the information on the field divisions links to the yield DB 73, the insect and animal plexus DB 76, the phenology DB 75, the photo recording DB 85, and the coordinate DB 80. All of the information on the rib divisions links to the planting DB 71, the vegetation DB 72, the phenology DB 75, the photo recording DB 85, and the coordinate DB 80.

Figure 19:
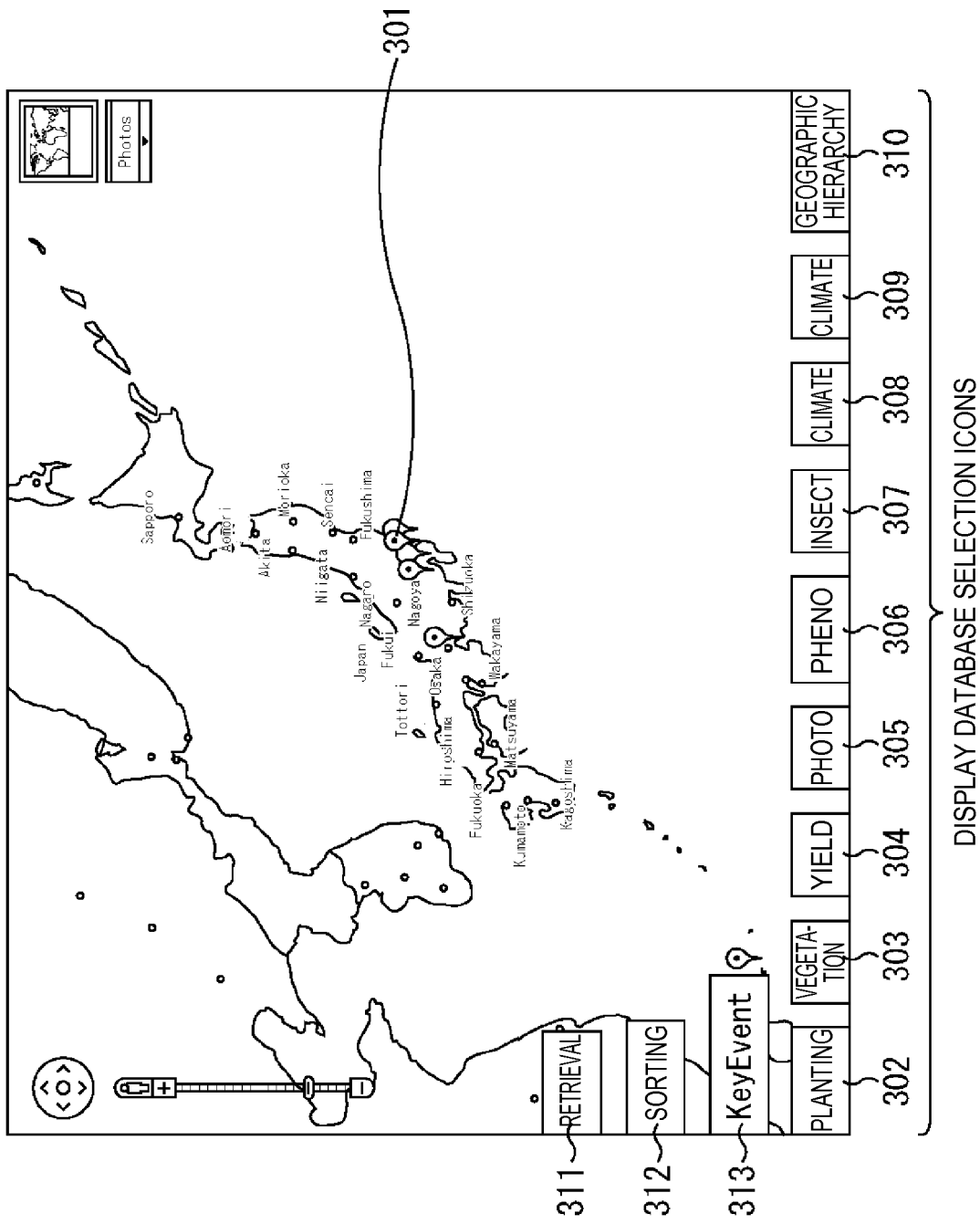
FIG. 19 is a diagram illustrating a display example of distribution of fields on a map.

FIG. 19 is a diagram illustrating a display example of the distribution of the fields on the map. In this example, the positions of the fields are indicated by flags 301 on the globe map. Icons 302 to 309 respectively correspond to the planting DB 71, the vegetation DB 72, the yield DB 73, the photo recording DB 85, the phenology DB 75, the insect and animal plexus DB 76, the climatic division DB 78, and the weather DB 79 and are operated when each DB is read. A geographic hierarchy icon 310 is operated when a field level is selected.

An icon 311 is operated when retrieval is instructed. An icon 312 is operated when sorting is instructed. An icon 313 is operated when a key event is instructed.

When the retrieval icon 311 is operated, the retrieval unit 61 of the server 11 retrieves all words and file names. The retrieval unit 61 also has a synonym retrieval function. Thus, batch retrieval can also be performed when date formats are different. For example, dates such as "Apr. 1, 2011," "20110401," "01042011," "2011/4/1," "1/4/2011," and "2011, April 1" are considered to be identical. Further, batch retrieval in which kana notation/kanji notation/Japanese names/scientific names/English names/vernacular names of species are considered to be identical can also be performed. For example, potato and *Solanum tuberosum* are considered to be identical.

When the sorting icon 312 is operated, the retrieval unit 61 performs sorting for each parameter. For example, retrieval results can be rearranged for each parameter such as a date order or Japanese syllabary order.

Of these icons, only the operable icons are displayed on the screen.

[Process of Referring to Previous Farm Field Information]

Next, a process when previous farm field information is referred to will be described with reference to FIG. 20. FIG. 20 is a diagram for describing the process when previous farm field information is referred to.

In step S101, the acquisition unit 122 of the terminal 12 acquires information regarding levels of the fields 21. That is, when the user refers to the information regarding the levels of the fields 21, the user operates the input unit 103 to select the geographic hierarchy icon 310 (see FIG. 19). When this operation is performed, the display unit 102D displays a screen used to select the levels of the fields 21. That is, the levels of the list of the fields are displayed. The user operates the input unit 103 to select the field 21 to be referred to from the screen. When the acquisition unit 122 acquires the information regarding the selection, the transmission unit 105T outputs the information regarding the selection to the server 11.

In step S141, the reception unit 53R of the server 11 receives the information regarding the levels of the fields 21 selected by the terminal 12. In step S142, a process of generating and outputting a list of the fields 21 with the levels selected by the terminal 12 in step S101 is performed. That is, the retrieval unit 61 retrieves the coordinate DB 80, the list of the fields 21 with the levels received in step S141 is generated, and the transmission unit 53T outputs the list to the terminal 12.

In step S102, a process of receiving and displaying the list is performed. That is, the list output from the server 11 is received by the reception unit 105R of the terminal 12 and the list is displayed on the display unit 102D by the display control unit 121.

The user operates the input unit 103 to select the field 21 to be referred to from the display list. In step S103, the transmission unit 105T outputs the information regarding the field 21 selected from the list.

In step S143, the reception unit 53R of the server 11 receives the information regarding the field 21 selected by the terminal 12.

In step S144, the retrieval unit 61 retrieves the DB 55 of the information regarding the field received in step S143. That is, the DBs 55 related to the field 21 with the level designated by the user are retrieved. In step S145, a process of outputting the list of the retrieved DBs 55 of the field 21 is performed. That is, the retrieval unit 61 generates the list of the related DBs 55 based on the retrieval result and the transmission unit 53T outputs the list to the terminal 12.

In step S104, the reception unit 105R of the terminal 12 receives the list of the retrieved DBs 55 of the field 21. In step S105, the display control unit 121 displays the received list of the DBs 55 of the field 21. That is, the list is displayed on the display unit 102D.

The user operates the input unit 103 to input the coordinates of the field 21 and the DB 55 to be referred to in the displayed list. In step S106, the acquisition unit 122 acquires information regarding the input coordinates of the field 21 and the DB 55 to be referred to. In step S107, the transmission unit 105T outputs the information acquired in step S106.

In step S146, the reception unit 53R of the server 11 receives the information acquired by the terminal 12. In step S147, the retrieval unit 61 reads the information regarding the field 21 at the designated coordinates of the designated DB 55. That is, the information regarding the field 21 at the designated coordinates of the DB 55 designated by the user and received in step S146 is read. In step S148, the transmission unit 53T outputs the read information regarding the field 21. That is, the information read in step S147 is output to the terminal 12.

In step S108, the reception unit 105R of the terminal 12 receives the read information regarding the field 21. In step S109, the display control unit 121 displays the received information regarding the field 21.

The user views the information regarding the field displayed on the display unit 102D and operates the input unit 103 to select a date of the information to be referred to. In step S110, the acquisition unit 122 acquires information regarding the selection of the date of the information to be referred to. The information regarding the selection of the date is output to the server 11 by the transmission unit 105T.

In step S149, the reception unit 53R of the server 11 receives the information regarding the selection of the date of the information to be referred to. In step S150, the retrieval unit 61 reads the information regarding the designated date. That is, the information received in step S149 is read and the read information regarding the date is output by the transmission unit 53T in step S151.

In step S111, the reception unit 105R of the terminal 12 receives the read information regarding the date. In step S112, the display control unit 121 displays the information regarding the date received in step S111.

In this way, by designating the DBs 55 which the user desires to refer to, the coordinates of the field division 151 or the like, and the date, the information regarding the DBs 55 at each of the coordinates, e.g., history information regarding the previous farm field and another farm field designated by the user, is displayed on the display unit 102D, so that the user can confirm the information.

As described above, the level of the field has been selected using the geographic hierarchy icon 310. However, by operating the flag 301 of a predetermined field 21, the field 21 to be referred to can be designated directly.

[Photo Upload Process]

Next, a process when the user uploads photos from the terminal 12 to the server 11 will be described. FIG. 21 is a diagram for describing a photo upload process.

In step S201, the acquisition unit 122 of the terminal 12 acquires photo data. For example, when the user finds a predetermined plant in the field 21 and uploads a photo thereof to the server 11, the photographing unit 104 photographs the plant. When the photographing is performed, the photo data is acquired by the acquisition unit 122. Of course, photo data stored in advance in a memory or the like can also be acquired as photo data to be uploaded.

In step S202, the coordinate detection unit 101 acquires GPS coordinates. That is, the coordinates of a subject photographed by the terminal 12 are acquired. The coordinates can be set as a current position of the terminal 12 or can also be set as more accurate coordinates of a subject obtained by calculating a distance and a direction from the current position to the subject and correcting the current position. Further, the user can also be allowed to operate the input unit 103 and input the coordinates.

In step S203, the display control unit 121 displays the DB 55 to be linked. In step S204, the acquisition unit 122 acquires information regarding selection of the DB 55 to be linked. That is, when the user operates the input unit 103 to select the DB 55 to be linked from a displayed list, the acquisition unit 122 acquires the information regarding the selection.

Further, the user operates the input unit 103 to input information (mainly, text information) to be added as a tag to a photo to be uploaded. For example, when a photo of napa cabbage is photographed, a name "napa cabbage" is input as tag information. When the information is input, not only can text be input from a keyboard, but a method of selecting a predetermined section from a prepared input page can also be used. In step S205, the acquisition unit 122 acquires the input information set as the tag. In step S206, the transmission unit 105T outputs the information acquired in steps S201, S202, S204, and S205.

In step S231, the reception unit 53R of the server 11 receives the information transmitted from the terminal 12. In step S232, the control unit 54 records the information received in step S231 in the DB 55. That is, the photo photographed by the user is recorded along with the tag in the photo recording DB 85 and the information is linked to the DB 55 designated by the user.

In this way, the user can upload a predetermined photo and a tag from the terminal 12 to the server 11. The user can refer to the uploaded information later through the process described above in FIG. 20.

Even when various kinds of information are uploaded as well as the photo, the same process is performed. For example, when 1 kg of napa cabbage is harvested from the predetermined rib 152, "1 kg of napa cabbage" is input as information to be uploaded. When the yield DB 73 is selected as the DB 55, the information "1 kg of napa cabbage" is recorded in association with the acquired coordinates of the rib 152.

[Process of Generating Cause-and-Effect Estimation Graph of Key Event]

When the user finds an event considered to correspond to a key event, the event can be recorded as a key event in the meta-DB 86. Based on this, a cause-and-effect estimation graph of the key event can be generated. The key event is an event estimated to be important in terms of management of the collaborative farming and is defined by link of name recording of a natural language and corresponding items of all of the DBs.

Next, a process of generating a cause-and-effect estimation graph of a key event will be described. FIG. 22 is a diagram for describing the process of generating the cause-and-effect estimation graph of the key event.

When the process of generating the cause-and-effect estimation graph of the key event starts, the user operates the input unit 103 to select the key event icon 313 (see FIG. 19). At this time, in step S301, the acquisition unit 122 receives selection of the key event icon 313. In step S302, the acquisition unit 122 acquires photo data and a date. That is, when the user photographs a plant which is an event which the user desires to record as a key event using the photographing unit 104 and operates the input unit 103 to input the date, such information is acquired by the acquisition unit 122.

In step S303, the coordinate detection unit 101 acquires the GPS coordinates. That is, the coordinates corresponding to the photographed photo are acquired.

In step S304, the acquisition unit 122 acquires input text. That is, when the user operates the input unit 103 to input text information as a key event, the text information is acquired. For example, when the user finds a rosette of napa cabbage, the user can photograph the cabbage and input the text "rosette of napa cabbage" as a key event.

In step S305, the transmission unit 105T inputs the information to the server 11. That is, the information acquired in steps S302, S303, and S304 is output to the server 11.

In step S351, the reception unit 53R of the server 11 receives the information transmitted from the terminal 12. In step S352, the key event processing unit 64 records the received information in the meta-DB 86. That is, the information acquired in steps S302, S303, and S304 by the terminal 12 is recorded in the meta-DB 86 serving as a key event DB.

In step S306, the acquisition unit 122 of the terminal 12 acquires the levels of the fields 21. That is, when the user records the key event, the user operates the input unit 103 to select the geographic hierarchy icon 310 (see FIG. 19). When this operation is performed, the display unit 102D displays a screen used to select the levels of the fields 21. The user operates the input unit 103 to select the levels of the fields 21 to be referred to from the screen. When the acquisition unit 122 acquires the information regarding the selection, the transmission unit 105T outputs the information regarding the selection to the server 11.

In step S353, the reception unit 53R of the server 11 receives the information regarding the levels of the fields selected by the terminal 12. In step S354, a process of generating and outputting a list of the fields 21 with the levels selected by the terminal 12 in step S306 is performed. That is, the retrieval unit 61 retrieves the coordinate DB 80 and generates the list of the fields 21 with the levels received in step S353, and the transmission unit 53T outputs the list to the terminal 12.

In step S307, a process of receiving and displaying the list is performed. That is, the list output from the server 11 is received by the reception unit 105R of the terminal 12 and the list is displayed on the display unit 102D by the display control unit 121.

The user operates the input unit 103 to select the field 21 to be recorded from the displayed list. In step S308, the transmission unit 105T outputs information regarding the field 21 selected from the list.

In step S355, the reception unit 53R of the server 11 receives the information regarding the field 21 selected by the terminal 12.

In step S356, the retrieval unit 61 retrieves the DBs 55 of the field 21 received in step S355. That is, the DBs 55 related to the field 21 with the level designated by the user are retrieved. In step S357, a process of outputting a list of the retrieved DBs 55 of the field 21 is performed. That is, the retrieval unit 61 generates the list of the related DBs 55 based on the retrieval result and the transmission unit 53T outputs the list to the terminal 12.

In step S309, the reception unit 105R of the terminal 12 receives the list of the retrieved DBs 55 of the field 21. In step S310, the display control unit 121 displays the received list of the DBs 55 of the field 21. That is, the list is displayed on the display unit 102D.

The user operates the input unit 103 to input the coordinates of the field 21 and the DB 55 to be linked in the displayed list. In step S311, the acquisition unit 122 acquires information regarding the input coordinates of the field 21 and the DB 55 to be linked to the key event. In step S312, the transmission unit 105T outputs the information acquired in step S311.

In step S358, the reception unit 53R of the server 11 receives the information output from the terminal 12. In step S359, the retrieval unit 61 reads the information regarding the field 21 at the designated coordinates of the designated DB 55. That is, the information regarding the field 21 at the designated coordinates of the DB 55 designated by the user and received in step S358 is read. In step S360, the transmission unit 53T outputs the read information regarding the field 21. That is, the information read in step S359 is output to the terminal 12.

In step S313, the reception unit 105R of the terminal 12 receives the read information regarding the field 21. This information is displayed on the display unit 102D. The user views this display and confirms that the designated field 21 is the linked field 21. After the user confirms the designated field, the user operates the input unit 103 to give an instruction to link the designated DB 55 to the key event. Based on the instruction, the transmission unit 105T outputs a command for the link in step S314.

In step S361, the reception unit 53R of the server 11 receives the command for the link transmitted from the terminal 12. In step S362, the key event processing unit 64 links a newly recorded key event to the DB 55 of the designated field 21. That is, the key event newly recorded in the meta-DB 86 in step S352 is linked to the DB 55 of the field 21 designated by the user in step S311.

In step S315, the transmission unit 105T of the terminal 12 outputs a command to generate a cause-and-effect estimation graph of the key event. That is, when the user also generates the cause-and-effect estimation graph of the key event, the user operates the input unit 103 to give an instruction to output the command.

When the reception unit 53R of the server 11 receives the command from the terminal 12, the key event processing unit 64 generates the cause-and-effect estimation graph of the key event in step S363. In step S364, the transmission unit 53T outputs the cause-and-effect estimation graph of the key event generated in step S363.

In step S316, when the reception unit 105R of the terminal 12 receives the cause-and-effect estimation graph of the key event transmitted from the server 11, the display control unit 121 displays the cause-and-effect estimation graph of the key event on the display unit 102D.

In this way, the user can visually confirm the event correlated with the recorded key event. By accumulating the information of the DBs 55 frequently, management utilizing the previous experience can be performed.

FIG. 23 is a diagram schematically illustrating the process of generating the cause-and-effect estimation graph of the key event. As illustrated in the drawing, all of the DBs, i.e., the planting DB 71 to the photo recording DB 85 of the collaborative farm, are linked to the meta-DB 86 serving as the key event DB, as necessary. Based on the recorded content of the meta-DB 86, a cause-and-effect estimation graph 331 of a key event is generated. The linking is performed by the user, but the linking can also be performed automatically. In the cause-and-effect estimation graph 331, dots indicate key events and lines indicate linkage of the key events. Accordingly, the user can visually recognize a relation of the plurality of key events from the cause-and-effect estimation graph 331. The user can determine various farm work with reference to this information.

When the graph is generated, for example, the software Gephi (trademark) can be used. The software has a function of generating data for graphing display and output to TINAsoft and outputs a link between the key event DB which is the meta-DB 86 collectively linking a plurality of items of all of the DBs 55 and the key event DB in a form corresponding to graphing display.

The cause-and-effect estimation graph of the key event is generated for the following reasons. That is, in the management of the collaborative farming, it is necessary to decide management harvest strategies by comprehensively determining various measured indexes and a shape of an actual farm field that is difficult to digitize. At this time, an existing mathematics engineering method of supposing a certain mathematical model, performing model identification from extrapolation of measured data, and constructing an information amount criterion optimizing estimation using measured data as learning data in a frame of machine learning can be considered. However, it is difficult to effectively apply this method to an open system in which disturbance from the outside is large and time and space diversities of a system are extensive.

The first reason is that it is difficult to simply estimate how a plant reacts to parameters (for example, temperature, precipitation, sunshine, chemical indexes of soil) quantitatively measured as physical and chemical indexes. Further, the fact that the causal relationship of the parameters can be confirmed only through actual reaction of an organism called a plant can also be exemplified.

However, no management may not be performed since the estimation may not be performed simply from quantifiable measured parameters, but effective management is possible through experience in some cases in connection with biological phenomena (mainly, behaviors of an animal plexus or phenology) unsuitable for quantification. For example, it is difficult to physically estimate how weather will be in several months, but it is known by experience that crop species to be planted more can be estimated depending on a form which a plant takes. For example, when napa cabbage forms rosettes, it is known by experience that since the coming winter will be cold, it is better to plant more napa cabbage and to plant less of plants that are easily affected by cold.

To support the management using such human comprehensive determination and share the knowledge, the cause-and-effect estimation graph of the key event is useful. Specifically, suppose that a practitioner of the collaborative farming notices a symptom (for example, napa cabbage forming rosettes) which is effective for the management and not suitable for quantification. Since the symptom is not a quantitative index and but is typification of a reaction of an organism such as a plant, it is difficult to express the symptom numerically. However, the symptom can be recorded in natural language. For example, "napa cabbage is forming rosettes" can be recorded. This sentence is a key event. By associating indexes expected to be associated with the symptom with the DBs 55, its property can also be clarified to a third person.

For example, when the formation of rosettes by the napa cabbage is associated with the fact that the temperature of the coming winter will be lower, the formation of rosettes by the cabbage is linked to data corresponding to the climatic division DB 78 and the weather DB 79. Even when there is a relation between a predetermined key event and another key event, a link is formed between the key events and serves as a cause-and-effect estimation graph of the key event. For example, interlocking of "formation of rosettes by the cabbage" and "delay of sprouting time in the following spring" serves as a cause-and-effect estimation graph. The cause and effect mentioned here also include correlation.

The definition of a key event and the cause-and-effect estimation graph of the key event are based on the human comprehensive determination, but are also based on human subjective expectation from the viewpoint of scientific research. Accordingly, to verify repeatability or effectiveness, it is necessary to verify effectiveness when the management is attempted using the definition of a key event and the cause-and-effect estimation graph of the key event. Therefore, a free-software development method of mutually sharing and jointly constructing key events and the cause-and-effect estimation graphs of the key events between practitioners of the collaborative farming and performing the verification is necessary.

Specifically, a mechanism is introduced in such a manner that the meta-DB 86 is enhanced when a person practicing the collaborative farming determines that a key event and the cause-and-effect estimation graph of the key event are effective, and the meta-DB 86 is lessened when the key event and the cause-and-effect estimation graph of the key event are not effective. The key event determined to be effective is linked to more of the DBs 55 and linkage between the key events is similarly enhanced in the effective cause-and-effect estimation graph of the key event.

In this way, the DBs 55 are constructed as online interactive databases in which the cause-and-effect estimation graphs of the key events serving as collective experiences in the form associated with the quantifiable parameters are constructed and updated jointly and frequently by a collaborative farming practitioner group. That is, a group of a plurality of users of the farm work support system 1 can share information and reliably cultivate plants.

[Example of Meta-DB 86 of Key Event]

Events will be described as a specific example of a key event in the order of a key event name, recording in a free language, and associated DBs.

Key event name: recording wind protection effect

Recording in free language: In a place around which a structure such as a wall blocking wind is present, vegetable growth increases even under the same land conditions.

Associated DBs: the coordinate DB 80, the yield DB 73, the management recording DB 74, the vegetation DB 72, and the phenology DB 75

Key event name: soil formation and decrease in sprout rate of lettuce

Recording in free language: Lettuce sprouts well in cultivated land, but rarely sprouts when land is not continuously cultivated and a soil structure is formed.

Associated DBs: the planting DB 71, the management recording DB 74, the vegetation DB 72, and the phenology DB 75

Key event name: competitive growth

Recording in free language: Even when nutriment in earth is the same, vegetables grow larger by competition with other vegetation.

Associated DBs: the vegetation DB 72, the phenology DB 75, and the yield DB 73

As specific examples of the competitive growth, there are an example in which carrots become large through competition with black nightshade, and an example in which a sprout rate is bad in a rib in which summer grass is not cut, but individual vegetables grow more.

Key Event Name: Rosette Formation

Recording in free language: Some kinds of vegetables change to a form in which the lie flat on the ground during the winter season, do not wither even when it is cold, and survive until spring. Even in this state, the vegetables can be harvested.

Associated DB: the vegetation DB 72, the phenology DB 75, the yield DB 73, and the weather DB 79

Key Event Name: Tinged with Red

Recording in free language: During the winter season, vegetables such as carrots or cabbage are tinged with red in some cases. Even when tinged with red, the vegetables can be harvested.

Associated DBs: the vegetation DB 72, the phenology DB 75, the yield DB 73, and the weather DB 79

Key Event Name: Late Frost

Recording in free language: When the ground surface is 4° C. or less immediately after sprouting in spring, buds are completely destroyed due to late frost. Therefore, comprehensive countermeasures are necessary for establishment of sowing or seedlings.

Associated DBs: the planting DB 71, the management recording DB 74, the vegetation DB 72, the phenology DB 75, and the weather DB 79

[Others]

The network refers to a structure configured of at least two devices that are connected and through which information can be transmitted from a certain device to another device. The devices communicating via a network may be independent devices or may be internal blocks configured to form one device.

Communication may be not only wireless communication and wired communication, but may also be communication in which wireless communication and wired communication are mixed, i.e., communication in which wireless communication is performed in a certain section and wired communication is performed in another section. Further, communication from a certain device to another device is performed in a wired manner and communication from the other device to the certain device is performed in a wireless manner.

[Application of the Present Technology to Program]

The above-described series of processes can be executed by hardware or can be executed by software.

When the series of processing is performed by software, a program that forms the software is installed from a network or a recording medium to a computer that is incorporated in a dedicated hardware, or to, for example, a general-purpose personal computer that can perform various types of functions by installing various types of programs.

The recording medium including the program is configured to include the removable media 57 and 108 distributed to provide the program to users separately from the device body, as illustrated in FIGS. 2 and 3. The movable media 57 and 108 are configured to include a magnetic disk (including a floppy disk) on which the program is recorded, an optical disc (including a Compact Disk-Read Only Memory (CD-ROM) and a DVD), a magneto-optical disc (including a Mini-Disk (MD)), and a semiconductor memory. Alternatively, the movable media 57 and 108 are configured to include a flash ROM or a hard disk which is embedded in advance into the device body to be provided to users and on which the program is recorded.

Note that, in this specification, steps that record the program to be recorded in the recording medium do not necessarily have to be performed in time series in line with the order of the steps, and instead may include processing that is performed in parallel or individually.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

The embodiment of the present technology is not limited to the above-described embodiment. It should be understood by those skilled in the art that various modifications, combinations, sub-combinations and alterations may occur depending on design requirements and other factors insofar as they are within the scope of the appended claims or the equivalents thereof.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

[Other Configurations of the Present Technology]

Additionally, the present technology may also be configured as below.

(1)

A farm work support device including:

a reception unit configured to receive designation of plants to be cultivated;

a retrieval unit configured to retrieve a vegetation design which is a vegetation combination proper for construction of a mixed and dense growth state of the designated plants; and an output unit configured to output the retrieved vegetation design.

(2)

The farm work support device according to (1), further including:

an evaluation unit configured to evaluate a score of the retrieved vegetation design, wherein the output unit outputs the vegetation design corresponding to the score evaluated by the evaluation unit.

(3)

The farm work support device according to (1) or (2), further including:

a calculation unit configured to calculate a score of the retrieved vegetation design, wherein the evaluation unit evaluates the score calculated by the calculation unit.

(4)

The farm work support device according to any one of (1) to (3), wherein the output unit outputs the vegetation design corresponding to the score of which a value is higher.

(5)

The farm work support device according to any one of (1) to (4), wherein the retrieval unit retrieves the vegetation design from at least one of allelopathy of the plants and information regarding crop rotation aptitude.

(6)

The farm work support device according to any one of (2) to (5), wherein the score is an average value of scores of the crop rotation aptitude and the allelopathy to which a collection of the plants corresponds.

(7)

The farm work support device according to any one of (1) to (6), wherein the plants are cultivated according to collaborative farming.

(8)

The farm work support device according to any one of (1) to (7), wherein the plants are managed based on GPS coordinates of vegetation positions of the plants.

(9)

The farm work support device according to (8), wherein a tag is managed in conjunction with the GPS coordinates of the plants.

(10)

The farm work support device according to (9), wherein the tag is displayed to be superimposed on an image of the plants as an AR tag.

(11)

The farm work support device according to any one of (8) to (10), wherein a key event is managed in conjunction with the GPS coordinates of the plants.

(12)

The farm work support device according to any one of (8) to (11), wherein a photo of the plants is managed in conjunction with the GPS coordinates of the plants.

(13)

The farm work support device according to (12), wherein the associated key event is graphed.

(14)

The farm work support device according to any one of (1) to (13), wherein a field in which the plants vegetate is managed hierarchically.

(15)

The farm work support device according to (14), wherein the field is managed on a map.

(16)

A farm work support method including:
receiving designation of plants to be cultivated;
retrieving a vegetation design of the designated plants; and
outputting the retrieved vegetation design.

(17)

A program causing a computer to perform:
receiving designation of plants to be cultivated;
retrieving a vegetation design of the designated plants; and
outputting the retrieved vegetation design.

(18)

A recording medium recording a program causing a computer to perform:
receiving designation of plants to be cultivated;
retrieving a vegetation design of the designated plants; and
outputting the retrieved vegetation design.

(19)

A farm work support device including:
a reception unit configured to receive designation of plants to be cultivated;
an acquisition unit configured to acquire a vegetation design of the designated plants; and
a display unit configured to display the acquired vegetation design.

(20)

The farm work support device according to (19), wherein the farm work support device is carried and used in a field.

(21)

The farm work support device according to (19) or (20), further including:
a photographing unit configured to photograph the plants.

(22)

The farm work support device according to any one of (19) or (21), further including:

a detection unit configured to detect the GPS coordinates of vegetation positions of the plants.

(23)

The farm work support device according to (22), further including:
an input unit configured to input at least one of a tag conjunct with the GPS coordinates of the plants and a key event conjunct with the GPS coordinates of the plants.

(24)

The farm work support device according to (23), wherein the display unit displays the tag to be superimposed on an image of the plants photographed by the photographing unit.

(25)

The farm work support device according to any one of (19) to (24), wherein the display unit hierarchically displays a field in which the plants vegetate.

(26)

The farm work support device according to (25), wherein the display unit displays a position of the field on a map.

(27)

The farm work support device according to any one of (19) to (26), wherein the plants are cultivated according to collaborative farming (28)

The farm work support device according to (27), wherein the display unit displays the vegetation design corresponding to evaluated scores.

(29)

The farm work support device according to (28),
wherein the display unit displays the vegetation design corresponding to the scores of which a value is higher, and
wherein the input unit designates the number of displayed scores of which the value is higher.

(30)

The farm work support device according to any one of (19) to (29), wherein the display unit displays the vegetation design retrieved from at least one of allelopathy of the plants and information regarding crop rotation aptitude.

(31)

The farm work support device according to (30), wherein the score is an average value of all elements of the crop rotation aptitude and the allelopathy to which a collection of the plants corresponds.

(32)

A farm work support method including:
receiving designation of plants to be cultivated;
acquiring a vegetation design of the designated plants; and
displaying the acquired vegetation design.

(33)

A program causing a computer to perform:
receiving designation of plants to be cultivated;
acquiring a vegetation design of the designated plants; and
displaying the acquired vegetation design.

(34)

A recording medium recording a program causing a computer to perform:
receiving designation of plants to be cultivated;
acquiring a vegetation design of the designated plants; and
displaying the acquired vegetation design.

(35)

A farm work support system configured to:
receive designation of plants to be cultivated;
retrieve a vegetation design of the designated plants; and
display the retrieved vegetation design.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST 1 farm work support system
11 server
12 terminal
21 field
54 control unit
55 database
51 retrieval unit
62 calculation unit
63 evaluation unit
64 key event processing unit
104 photographing unit
106 control unit

The invention claimed is:

1. A farm work support device comprising:
at least one hardware processor; and
at least one non-transitory computer-readable storage medium storing processor-executable instructions that, when executed by the at least one hardware processor, cause the at least one hardware processor to:
receive a designation of plants to be cultivated, position information of cultivation sites in a field by a markerless process, at least an image of each of the designated plants, and additional information observed in the field, at least a portion of which is tagged to at least some of the position information for each respective cultivation site to be superimposed as a plurality of augmented reality tags on the respective images of the designated plants to be cultivated at the respective cultivation sites;
retrieve a plurality of stored potential vegetation designs that each include the designated plants to be cultivated, the potential vegetation designs being vegetation combinations proper for construction of a mixed and dense growth state of the designated plants;
calculate a symbiotic score for each of the plurality of potential vegetation designs, the symbiotic score being an average value of weighted scores obtained by evaluating prior interaction of the designated plants, the weighted scores including at least a weighted score for each of the designated plants based on yield and the additional information observed in the field;
select a vegetation design for cultivation from the plurality of potential vegetation designs based on the symbiotic scores, wherein the selected vegetation design for cultivation includes a new combination of plants based on the additional information observed in the field; and
output an image of the selected vegetation design for cultivation with the plurality of augmented reality tags for display on the respective images of the designated plants, wherein at least one augmented reality tag includes information related to a vegetation management task for a respective designated plant in the image of the respective designated plant.

2. The farm work support device according to claim 1, wherein the instructions cause the at least one hardware processor to select the vegetation design corresponding to a highest symbiotic score of the calculated symbiotic scores.

3. The farm work support device according to claim 1, wherein the instructions cause the at least one hardware processor to retrieve each of the plurality of stored vegetation designs based on at least one of allelopathy of the plants in a respective stored vegetation design and information regarding crop rotation aptitude of the plants in a respective stored vegetation design.

4. The farm work support device according to claim 1, wherein the symbiotic score is an average value of crop rotation aptitude scores and allelopathy scores corresponding to each plant in a potential vegetation design.

5. The farm work support device according to claim 1, wherein the designated plants are to be cultivated according to collaborative farming.

6. The farm work support device according to claim 1, wherein, after the designated plants are cultivated, the cultivated designated plants are managed based on GPS coordinates of the cultivation sites of the cultivated designated plants.

7. The farm work support device according to claim 6, wherein, after the designated plants are cultivated, the plurality of augmented reality tags are managed in conjunction with the GPS coordinates of the cultivation sites of the cultivated designated plants.

8. The farm work support device according to claim 7, wherein, after the designated plants are cultivated, a key event is managed in conjunction with the GPS coordinates of the cultivation sites of the cultivated designated plants.

9. The farm work support device according to claim 8, wherein a photo of the plants is managed in conjunction with the GPS coordinates of the plants.

10. The farm work support device according to claim 8, wherein the key event is graphed.

11. The farm work support device according to claim 6, wherein the field including the cultivation sites is managed hierarchically.

12. The farm work support device according to claim 11, wherein the field is managed on a map.

13. A farm work support method comprising:
receiving a designation of plants to be cultivated, position information of cultivation sites in a field by a markerless process, at least an image of each of the designated plants, and additional information observed in the field, at least a portion of which is tagged to at least some of the position information for each respective cultivation site to be superimposed as a plurality of augmented reality tags on the respective images of the designated plants to be cultivated at the respective cultivation sites;
retrieving a plurality of stored potential vegetation designs that each include the designated plants to be cultivated;
calculating a symbiotic score for each of the plurality of potential vegetation designs, the symbiotic score being an average value of weighted scores obtained by evaluating prior interaction of the designated plants, the weighted scores including at least a weighted score for each of the designated plants based on yield and the additional information observed in the field;
selecting a vegetation design for cultivation from the plurality of potential vegetation designs based on the symbiotic score, wherein the selected vegetation design for cultivation includes a new combination of plants based on the additional information observed in the field; and outputting an image of the selected vegetation design for cultivation with the plurality of augmented reality tags for display on the respective images of the designated plants, wherein at least one augmented reality tag includes information related to a vegetation management task for a respective designated plant in the image of the respective designated plant.

14. A non-transitory, computer-readable medium storing instructions, which when executed by a processor, cause the processor to perform:

receiving a designation of plants to be cultivated, position information of cultivation sites in a field by a markerless process, at least an image of each of the designated plants, and additional information observed in the field, at least a portion of which is tagged to at least some of the position information for each respective cultivation site to be superimposed as a plurality of augmented reality tags on the respective images of the designated plants to be cultivated at the respective cultivation sites;

retrieving a plurality of stored potential vegetation designs that each include the designated plants to be cultivated;

calculating a symbiotic score for each of the plurality of potential vegetation designs, the symbiotic score being an average value of weighted scores obtained by evaluating prior interaction of the designated plants, the weighted scores including at least a weighted score for each of the designated plants based on yield and the additional information observed in the field;

selecting a vegetation design for cultivation from the plurality of potential vegetation designs based on the symbiotic score, wherein the selected vegetation design for cultivation includes a new combination of plants based on the additional information observed in the field; and outputting an image of the selected vegetation design for cultivation with the plurality of augmented reality tags for display on the respective images of the designated plants, wherein at least one augmented reality tag includes information related to a vegetation management task for a respective designated plant in the image of the respective designated plant.

15. A farm work support device comprising:
at least one hardware processor; and
at least one non-transitory computer-readable storage medium storing processor-executable instructions that, when executed by the at least one hardware processor, cause the at least one hardware processor to:

receive a designation of plants to be cultivated, position information of cultivation sites in a field by a markerless process, at least an image of each of the designated plants, and additional information observed in the field, at least a portion of which is tagged to at least some of the position information for each respective cultivation site to be superimposed as a plurality of augmented reality tags on the respective images of the designated plants to be cultivated at the respective cultivation sites;

acquire a plurality of stored potential vegetation designs of the designated plants that each include the designated plants to be cultivated;

calculate a symbiotic score for each of the plurality of potential vegetation designs, the symbiotic score being an average value of weighted scores obtained by evaluating prior interaction of the designated plants, the weighted scores including at least a weighted score for each of the designated plants based on yield and the additional information observed in the field;

select a vegetation design for cultivation from the plurality of potential vegetation designs based on the symbiotic score, wherein the selected vegetation design for cultivation includes a new combination of plants based on the additional information observed in the field; and display an image of the selected vegetation design for cultivation superimposed with at least one of the plurality of augmented reality tags on a respective image of a designated plant, wherein at least one augmented reality tag includes information related to a vegetation management task for a respective designated plant in the image of the respective designated plant.

16. The farm work support device according to claim 15, wherein the farm work support device is carried and used in the field.

17. The farm work support device according to claim 16, further comprising:
a photographing unit configured to photograph the designated plants in the field after the designated plants are cultivated at respective cultivation sites.

18. The farm work support device according to claim 17, further comprising:
a detection unit configured to detect GPS coordinates of the cultivation sites in the field.

19. The farm work support device according to claim 18, further comprising:
an input unit configured to enable a user to input at least one of an augmented reality tag of the plurality of augmented reality tags to correspond with GPS coordinates of a cultivation site and a key event to correspond with GPS coordinates of a cultivation site.

20. The farm work support device according to claim 19, wherein a display unit displays an augmented reality tag of the plurality of augmented reality tags to be superimposed on an image of the cultivated designated plants photographed by the photographing unit.

21. The farm work support device according to claim 20, wherein the display unit hierarchically displays the field in which the designated plants vegetate after being cultivated.

22. The farm work support device according to claim 21, wherein the display unit displays a position of the field on a map.

23. The farm work support device according to claim 22, wherein the designated plants are to be cultivated according to collaborative farming.

24. The farm work support device according to claim 15, wherein a display unit displays the vegetation design corresponding to a highest symbiotic score of the calculated symbiotic scores.

25. The farm work support device according to claim 24, further comprising an input unit, wherein the input unit designates a number of displayed symbiotic scores which are higher than a value.

26. The farm work support device according to claim 15, wherein each of the plurality of acquired potential vegetation designs are acquired based on at least one of allelopathy of the designated plants and information regarding crop rotation aptitude of the designated plants.

27. The farm work support device according to claim 15, wherein the symbiotic score is an average value of all elements of crop rotation aptitude and allelopathy corresponding to the plants in a potential vegetation design.

28. A farm work support method comprising:
receiving a designation of plants to be cultivated, position information of cultivation sites in a field by a markerless process, at least an image of each of the designated plants, and additional information observed in the field, at least a portion of which is tagged to at least some of the position information to be superimposed as a plurality of augmented reality tags on the respective images of the designated plants to be cultivated at the respective cultivation sites;

acquiring a plurality of stored potential vegetation designs of the designated plants that each include the designated plants to be cultivated;

calculating a symbiotic score for each of the plurality of potential vegetation designs, the symbiotic score being an average value of weighted scores obtained by evaluating prior interaction of the designated plants, the weighted scores including at least a weighted score for each of the designated plants based on yield and the additional information observed in the field;

selecting a vegetation design for cultivation from the plurality of potential vegetation designs based on the symbiotic score, wherein the selected vegetation design for cultivation includes a new combination of plants based on the additional information observed in the field; and displaying an image of the selected vegetation design for cultivation superimposed with at least one of the plurality of augmented reality tags on a respective image of a designated plant, wherein at least one augmented reality tag includes information related to a vegetation management task for a respective designated plant in the image of the respective designated plant.

29. A non-transitory, computer-readable medium storing instructions, which when executed by a processor, cause the processor to perform:

receiving a designation of plants to be cultivated, position information of cultivation sites in a field by a markerless process, at least an image of each of the designated plants, and additional information observed in the field, at least a portion of which is tagged to at least some of the position information for each respective cultivation site to be superimposed as a plurality of augmented reality tags on the respective images of the designated plants to be cultivated at the respective cultivate sites;

acquiring a plurality of stored potential vegetation designs of the designated plants that each include the designated plants to be cultivated;

calculating a symbiotic score for each of the plurality of potential vegetation designs, the symbiotic score being an average value of weighted scores obtained by evaluating prior interaction of the designated plants, the weighted scores including at least a weighted score for each of the designated plants based on yield and the additional information observed in the field;

selecting a vegetation design for cultivation from the plurality of potential vegetation designs based on the symbiotic score, wherein the selected vegetation design for cultivation includes a new combination of plants based on the additional information observed in the field; and displaying an image of the selected vegetation design for cultivation superimposed with at least one of the plurality of augmented reality tags on a respective image of a designated plant, wherein at least one augmented reality tag includes information related to a vegetation management task for a respective designated plant in the image of the respective designated plant.

30. A farm work support system including a processor in communication with a memory, the processor configured to:

receive a designation of plants to be cultivated, position information of cultivation sites in a field by a markerless process, at least an image of each of the designated plants, and additional information observed in the field, at least a portion of which is tagged to at least some of the position information for each respective cultivation site to be superimposed as a plurality of augmented reality tags on the respective images of the designated plants to be cultivated at the respective cultivation sites;

retrieve a plurality of stored potential vegetation designs of the designated plants that each include the designated plants to be cultivated;

calculate a symbiotic score for each of the plurality of potential vegetation designs, the symbiotic score being an average value of weighted scores obtained by evaluating prior interaction of the designated plants, the weighted scores including at least a weighted score for each of the designated plants based on yield and the additional information observed in the field;

selecting a vegetation design for cultivation from the plurality of potential vegetation designs based on the symbiotic score, wherein the selected vegetation design for cultivation includes a new combination of plants based on the additional information observed in the field; and display an image of the selected vegetation design for cultivation superimposed with at least one of the plurality of augmented reality tags on a respective image of a designated plant, wherein at least one augmented reality tag includes information related to a vegetation management task for a respective designated plant in the image of the respective designated plant.

31. The farm work support device according to claim 1, wherein the hardware processor calculates the symbiotic score using the following equation:

$$SC = \Sigma E_i / n$$

wherein SC is the symbiotic score, n is a number of weighted scores, and Ei is a weighted score of an i-th plant of a potential vegetation design.

32. The farm work support method of claim 13, wherein calculating the symbiotic score includes using the following equation:

$$SC = \Sigma E_i / n$$

wherein SC is the symbiotic score, n is a number of weighted scores, and Ei is a weighted score of an i-th plant of a potential vegetation design.

33. The non-transitory recording medium of claim 14, wherein calculating the symbiotic score includes using the following equation:

$$SC = \Sigma E_i / n$$

wherein SC is the symbiotic score, n is a number of weighted scores, and Ei is a weighted score of an i-th plant of a potential vegetation design.

34. The farm work support device according to claim 15, wherein the hardware processor calculates the symbiotic score using the following equation:

$$SC = \Sigma E_i / n$$

wherein SC is the symbiotic score, n is a number of weighted scores, and Ei is a weighted score of an i-th plant of a potential vegetation design.

35. The farm work support method of claim 28, wherein calculating the symbiotic score includes using the following equation:

$$SC = \Sigma E_i / n$$

wherein SC is the symbiotic score, n is a number of weighted scores, and Ei is a weighted score of an i-th plant of a potential vegetation design.

36. The non-transitory recording medium of claim 29, wherein calculating the symbiotic score includes using the following equation:

$$SC = \Sigma Ei/n$$

wherein SC is the symbiotic score, n is a number of weighted scores, and Ei is a weighted score of an i-th plant of a potential vegetation design.

37. The farm work support system of claim 30, wherein the symbiotic score is calculated using the following equation:

$$SC = \Sigma Ei/n$$

wherein SC is the symbiotic score, n is a number of weighted scores, and Ei is a weighted score of an i-th plant of a potential vegetation design.

38. The farm work support device according to claim 1, wherein the selected vegetation design includes a species diversity exceeding a natural state.

39. The farm work support device according to claim 1, wherein the additional information includes at least names of plants vegetating in the field.

\* \* \* \* \*